(12) United States Patent
Muramatsu et al.

(10) Patent No.: US 12,528,473 B2
(45) Date of Patent: Jan. 20, 2026

(54) INFORMATION PROCESSING SYSTEM, INFORMATION PROCESSING METHOD, AND RECORDING MEDIUM

(71) Applicant: HONDA MOTOR CO., LTD., Tokyo (JP)

(72) Inventors: Yusuke Muramatsu, Wako (JP); Naohiro Sakamoto, Wako (JP); Hiroko Adachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 18/582,374

(22) Filed: Feb. 20, 2024

(65) Prior Publication Data
US 2024/0326827 A1    Oct. 3, 2024

(30) Foreign Application Priority Data

| Mar. 29, 2023 | (JP) | 2023-053092 |
| Mar. 29, 2023 | (JP) | 2023-053093 |
| Mar. 29, 2023 | (JP) | 2023-053094 |
| Mar. 29, 2023 | (JP) | 2023-053100 |
| Mar. 29, 2023 | (JP) | 2023-053101 |

(51) Int. Cl.
*B60W 40/08* (2012.01)
*B60W 50/14* (2020.01)
*G06V 10/762* (2022.01)
*G06V 20/59* (2022.01)

(52) U.S. Cl.
CPC ............ *B60W 40/08* (2013.01); *B60W 50/14* (2013.01); *G06V 10/762* (2022.01); *G06V 20/597* (2022.01); *B60W 2050/143* (2013.01); *B60W 2050/146* (2013.01); *B60W 2420/403* (2013.01); *B60W 2540/22* (2013.01); *B60W 2540/221* (2020.02)

(58) Field of Classification Search
CPC ................. B60W 40/08; B60W 50/14; B60W 2540/221; B60W 2050/143; B60W 2050/146; B60W 2420/403; B60W 2540/22; G06V 10/762; G06V 20/597
USPC ........................................................ 340/576
See application file for complete search history.

(56) References Cited

U.S. PATENT DOCUMENTS

| 12,395,963 B2 * | 8/2025 | Shimura | H04W 64/003 |
| 2010/0171585 A1 * | 7/2010 | Takeuchi | H04N 7/163 340/3.1 |
| 2010/0235012 A1 * | 9/2010 | Cox | G06F 1/1677 706/46 |
| 2015/0243172 A1 * | 8/2015 | Eskilson | H04L 67/12 701/1 |

(Continued)

FOREIGN PATENT DOCUMENTS

| JP | 2017-197002 A | 11/2017 |
| JP | 2021-096784 A | 6/2021 |

*Primary Examiner* — Naomi J Small
(74) *Attorney, Agent, or Firm* — Rankin, Hill & Clark LLP

(57) ABSTRACT

An embodiment provides a state estimation device including: an acquisition unit configured to acquire a state variable including an observation value obtained by observing a steersman who steers an moving object; and an estimation unit including a state model having a correlation between the state variable and a cognitive load during steering of the steersman and configured to estimate a state of the steersman from the state variable acquired by the acquisition unit.

18 Claims, 24 Drawing Sheets

(56) References Cited

U.S. PATENT DOCUMENTS

| | | | |
|---|---|---|---|
| 2015/0246673 A1* | 9/2015 | Tseng | B60W 60/0013 |
| | | | 701/23 |
| 2015/0326704 A1* | 11/2015 | Ko | H04M 1/72457 |
| | | | 455/456.3 |
| 2017/0311865 A1* | 11/2017 | Okuya | A61B 5/6893 |
| 2020/0029896 A1* | 1/2020 | Yamada | A61B 5/681 |
| 2020/0219204 A1* | 7/2020 | Moetteli | A47F 10/06 |
| 2021/0370983 A1* | 12/2021 | Oba | G08G 1/166 |
| 2025/0180777 A1* | 6/2025 | Camargo | G01V 20/00 |

\* cited by examiner

INFORMATION PROCESSING SYSTEM, INFORMATION PROCESSING METHOD, AND RECORDING MEDIUM

INCORPORATION BY REFERENCE

The present application claims priority under 35 U.S.C. § 119 to Japanese Patent Application No. 2023-053093 filed on Mar. 29, 2023, Japanese Patent Application No. 2023-053092 filed on Mar. 29, 2023, Japanese Patent Application No. 2023-053094 filed on Mar. 29, 2023, Japanese Patent Application No. 2023-053100 filed on Mar. 29, 2023, and Japanese Patent Application No. 2023-053101 filed on Mar. 29, 2023. The content of the applications is incorporated herein by reference in its entirety.

BACKGROUND OF THE INVENTION

Field of the Invention

The present invention relates to an information processing system, an information processing method, and a recording medium.

Description of the Related Art

In recent years, active efforts have been made to provide sustainable access to a transportation system while taking into consideration even vulnerable people such as aged people, disabled people, and children among other traffic participants. To realize this, the focus is on research and development for further improving traffic safety and convenience through a technique for driving support.

For example, Japanese Patent Laid-Open No. 2017-197002 discloses a configuration for analyzing an amount of operation of an accelerator pedal, a brake pedal, and a steering wheel related to driving of a vehicle and determining a level of tension of a driver who drives the vehicle. Further, Japanese Patent Laid-Open No. 2021-096784 discloses a configuration for using an image obtained by capturing a face of a driver of a vehicle to determine a drowsiness level of the driver.

By the way, it is preferable that a technique for supporting a steersman such as a driver of a vehicle copes with a state of the steersman more appropriately.

In order to solve the problem described above, an object of the present invention is to more appropriately determine a state of a steersman who steers a moving object such as a vehicle. Thus, the present invention is to contribute to the development of a sustainable transportation system.

SUMMARY OF THE INVENTION

An aspect of the present invention provides an information processing system including an acquisition unit configured to acquire a state variable including an observation value obtained by observing a steersman who steers an moving object, and an estimation unit including a state model having a correlation between the state variable and a cognitive load during steering of the steersman and configured to estimate a state of the steersman from the state variable acquired by the acquisition unit.

According to the aspect of the present invention, it is possible to estimate the state of the steersman, who steers the moving object, using the state model. Therefore, it is possible to more appropriately determine the state of the steersman, and thus to contribute the development of a sustainable transportation system.

DETAILED DESCRIPTION OF THE PREFERRED EMBODIMENTS

1. First Embodiment

[1-1. Configuration of Information Processing System]

Figure 1:
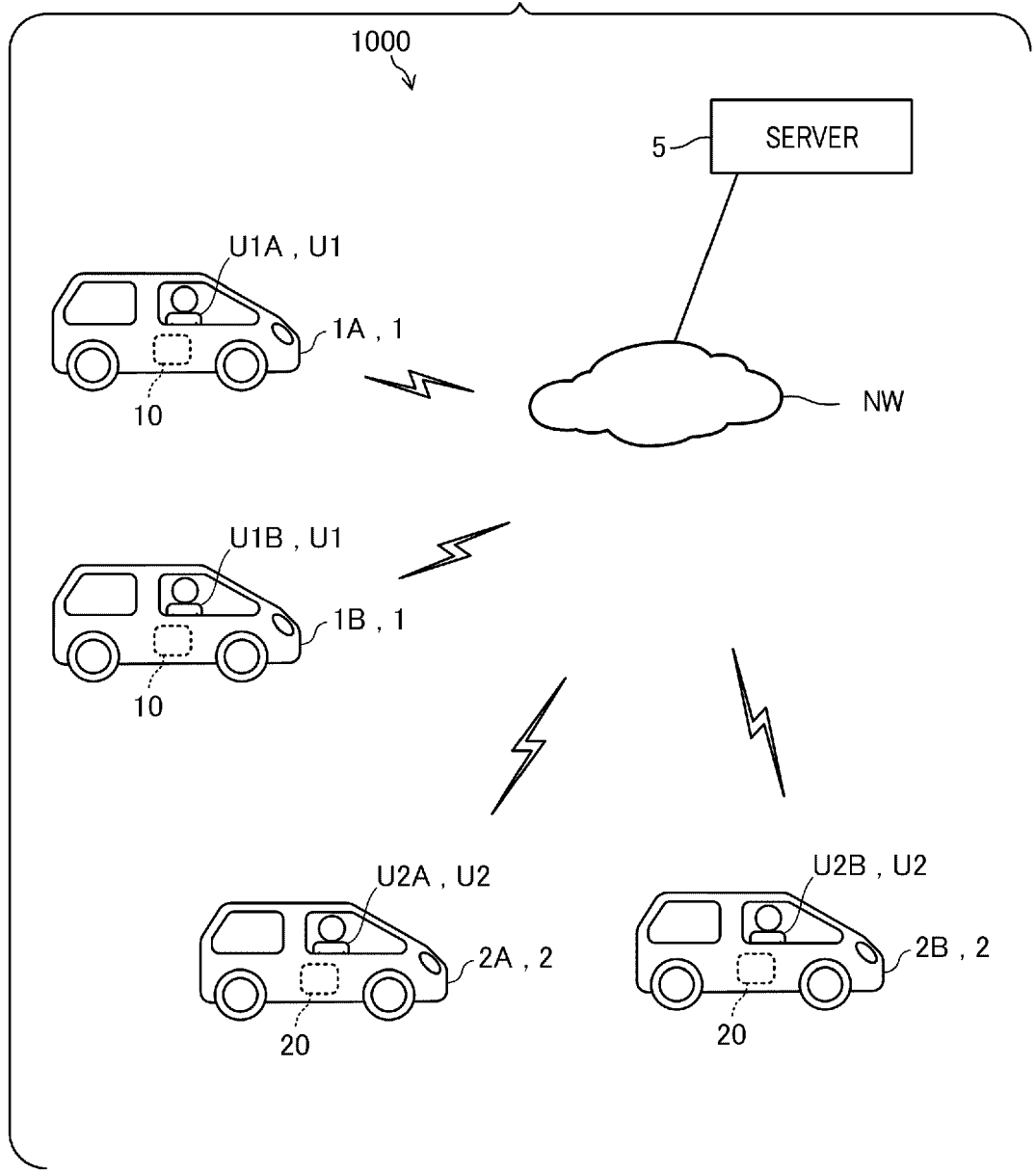
FIG. 1 is a diagram showing an example of a configuration of an information processing system according to a first embodiment.

FIG. 1 is a diagram showing a configuration of an information processing system 1000.

The information processing system 1000 includes an information processing device 10 mounted on a vehicle 1, a state estimation device 20 mounted on the vehicle 2, and a server 5. The server 5 is connected to the information processing device 10 and the state estimation device 20 via a communication network NW so as to be capable of being in data communication with each other. FIG. 1 shows, as an example, a configuration in which the information processing system 1000 includes information processing devices 10 mounted on two vehicles 1A and 1B, respectively, and state estimation devices 20 mounted on two vehicles 2A and 2B, respectively, but there is no limit on the numbers of the information processing devices 10 and the state estimation devices 20 included in the information processing system 1000. In the following description, the vehicles 1A and 1B will be referred to as a vehicle 1 unless otherwise distinguished, and the vehicles 2A and 2B will be referred to as a vehicle 2 unless otherwise distinguished.

The vehicle 1 and the vehicle 2 are examples of moving objects. The vehicles 1 and 2 only need to have a cabin (passenger compartment) in which a user U gets, and the moving object is not limited to a vehicle with four wheels, but may be a vehicle with five or more wheels, or a vehicle with three or less wheels. Further, the vehicle as a moving object may be, for example, a large vehicle such as a bus, a commercial vehicle, or a work vehicle. In addition, an example of the moving object may include not only the land moving object such as the vehicle described above but also a marine moving object such as a ship or a submarine, an aerial moving object such as an aircraft or an airship including an electric vertical take-off and landing aircraft (eVTOL), or a space moving object such as a spacecraft or an artificial satellite.

A user U1A gets in the vehicle 1A, and a user U1B gets in the vehicle 1B. A user U2A gets in the vehicle 2A, and a user U2B gets in the vehicle 2B. The users U1A and U1B will be referred to as a user U1 unless otherwise distinguished, and the users U2A and U2B will be referred to as a user U2 unless otherwise distinguished. Each of the user U1 and the user U2 is an example of a steersman who steers the moving object. Driving the vehicle 1 or the vehicle 2 by the users U1 and U2 is an example of steering.

The communication network NW is a communication network configured by a public line network, a private line, other communication circuits, and the like.

The server 5 is a computer that transmits and receives data to and from each of the information processing device 10 and the state estimation device 20. The server 5 may be a single server computer, may be configured by a plurality of server computers, or may be a cloud server. The server 5 corresponds to an example of a management device.

[1-2. Configuration of Information Processing Device]

Figure 2:
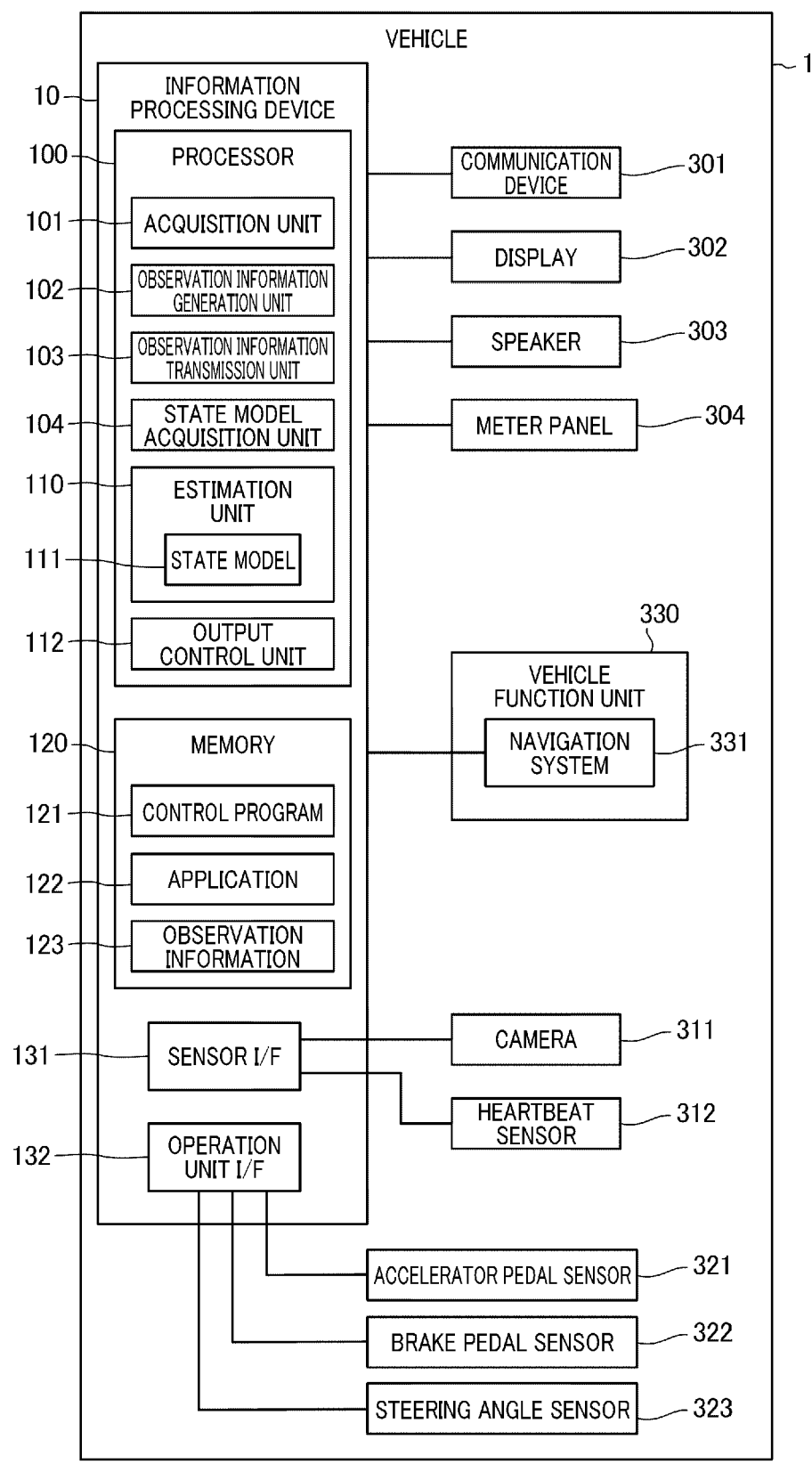
FIG. 2 is a block diagram showing an example of a configuration of an information processing device according to the first embodiment.
Figure 3:
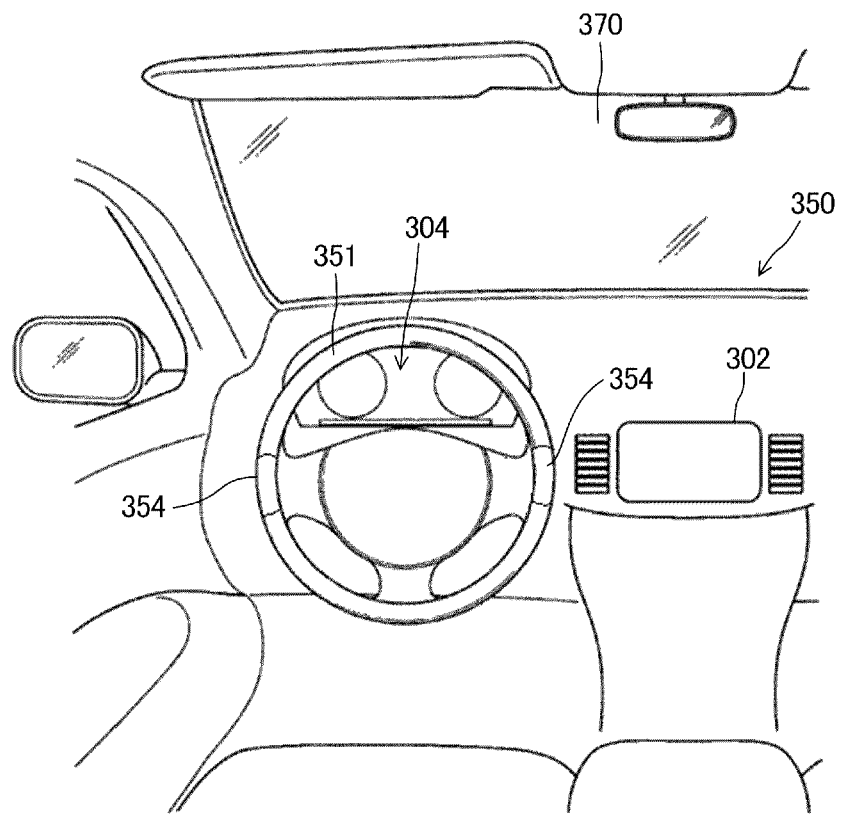
FIG. 3 is a diagram showing an example of a configuration of a vehicle.

FIG. 2 is a block diagram showing an example of a configuration of the information processing device 10 mounted on the vehicle 1. FIG. 3 is a diagram showing an example of a configuration of the vehicle 1.

The information processing device 10 is a device mounted on the vehicle 1, and is a computer including a processor 100. The information processing device 10 may be a device fixed to the vehicle 1, or may be a portable device that is temporarily installed in the vehicle 1. An example of the information processing device 10 to be adopted may include a smartphone, a tablet computer, another type of personal computer, a car navigation device, or a display audio device.

The information processing device 10 is connected with a communication device 301, a display 302, a speaker 303, and a meter panel 304 which are mounted on the vehicle 1. These devices may be built in the information processing device 10.

The communication device 301 is a wireless communication device including a transmitter that transmits data and a receiver that receives data, and executes cellular communication. The communication device 301 is connected to the communication network NW under control of the processor 100, and executes data communication with the server 5 through the communication network NW.

The display 302 has a display screen configured by a liquid crystal display panel or an organic electro luminescence (EL) panel, and displays characters or images on the display screen based on a display signal or digital display data output by the information processing device 10. For example, as shown in FIG. 3, the display 302 is installed on a dashboard 350 or an instrument panel of the vehicle 1, and is located at a position where the user U1 excellently see.

The speaker 303 outputs sound based on an sound signal or digital sound data output by the information processing device 10.

As shown in FIG. 3, the meter panel 304 is installed in front of or near a position where the user U1 is sitting. The meter panel 304 displays information indicating a vehicle speed, an engine rotation speed, and a battery remaining capacity of the vehicle 1. The meter panel 304 may be configured using a display screen such as a liquid crystal display panel, or may be configured by an indicator lamp having a light emitting diode (LED) or the like. Each of the display 302, the speaker 303, and the meter panel 304 is an example of an output device included in the vehicle 1. The output device includes a device that outputs information to the user U1 using audio, video, images, light, or other stimuli. Each of the display 302 and the meter panel 304 is an example of a display unit.

The information processing device 10 is connected with a camera 311 and a heartbeat sensor 312.

The camera 311 is a digital camera that captures an image capturing range including a face of the user U1, and outputs captured image data to the information processing device 10. The captured image data of the camera 311 is used for at least one of observation of a pupil diameter of the user U1 and detection of breathing of the user U1, as will be described below.

The heartbeat sensor 312 is a sensor that measures a heartbeat of the user U1 per unit time. The heartbeat sensor 312 is connected to a pair of electrodes 354 installed on a steering wheel 351 of the vehicle 1, for example, as shown in FIG. 3. In this example, the heartbeat sensor 312 detects a change in potential on a body surface accompanying a pulse rate of the user U1 while a hand of the user U1 is in contact with the electrodes 354, thereby detecting a heartbeat of the user U1. The heartbeat sensor 312 calculates a heartbeat interval of the user U1. The heartbeat sensor 312 is, for example, a sensor unit including a sensor that detects a heartbeat using the electrodes 354 and a control circuit that calculates a heartbeat interval. The heartbeat sensor 312 outputs a heartbeat interval as a measurement value. The heartbeat interval is a time value in units of seconds or milliseconds, for example. The configuration for the heartbeat sensor 312 to detect the heartbeat is not limited to the electrodes 354, and the heartbeat of the user U1 may be detected by, for example, an optical sensor worn on the body of the user U1. In addition, the processor 100 may calculate the heartbeat interval based on the heartbeat detected by the heartbeat sensor 312.

Each of the camera 311 and the heartbeat sensor 312 is configured to observe a body of the user U1, and can also be called an observation unit. Using the observation unit, the information processing device 10 may not only observe the pupil diameter, the breathing interval, and the heartbeat interval of the user U1, but also measure other biological information.

The information processing device 10 includes a sensor I/F (interface) 131. The sensor I/F 131 is a connection unit that is connected to the camera 311 and the heartbeat sensor 312 in a wired manner, and includes a connector for connecting a cable and an interface circuit. The sensor I/F 131 acquires captured image data output by the camera 311 and measurement data of the heartbeat interval output by the heartbeat sensor 312.

The information processing device 10 includes an operation unit I/F 132. The operation unit I/F 132 is connected with at least one of an accelerator pedal sensor 321, a brake pedal sensor 322, and a steering angle sensor 323 provided in the vehicle 1. The accelerator pedal sensor 321 detects an amount of stepping of an accelerator pedal, which is an operation unit for starting up and accelerating the vehicle 1, or a throttle opening corresponding to the operation of the accelerator pedal. The brake pedal sensor 322 detects an amount of stepping of the brake pedal, which is an operation unit for decelerating and stopping the vehicle 1. The steering angle sensor 323 detects an amount of operation of the steering wheel 351, which is an operation unit, or a steering angle of the vehicle 1 accompanying the operation of the steering wheel 351. Each of the accelerator pedal sensor 321, the brake pedal sensor 322, and the steering angle sensor 323 outputs a detection value to the information processing device 10. The operation unit I/F 132 acquires data on an amount of operation output from each of the accelerator pedal sensor 321, the brake pedal sensor 322, and the steering angle sensor 323. The operation unit I/F 132 is, for example, a communication device connected to a controller area network (CAN) installed in the vehicle 1, and may acquire the amount of operation of each of the operation units via the CAN.

Further, the information processing device 10 is connected with a vehicle function unit 330 mounted on the vehicle 1. In the vehicle 1, the vehicle function unit 330 is a device having a different function from the information processing device 10. The vehicle function unit 330 is a device that executes a function separately from the information processing device 10 and outputs sound based on the function of the vehicle function unit 330. For example, the vehicle function unit 330 may be installed on the dashboard 350, or may be housed in a housing integrated with the information processing device 10. A specific configuration of the vehicle function unit 330 can be changed as appropriate depending on specifications of the vehicle 1. In the present embodiment, a navigation system 331 is exemplified as the vehicle function unit 330.

The navigation system 331 is, for example, hardware including a processor different from the processor 100, and includes, for example, an electronic control unit (ECU) installed in the vehicle 1 separately from the information processing device 10. The navigation system 331 searches for a moving path along which the vehicle 1 moves, and guides the moving path while the vehicle 1 is moving. The navigation system 331 causes the display 302 to display a screen for navigation including a map and an image showing a current position of the vehicle 1 in order to execute path guidance along the searched path. Further, the navigation system 331 causes the speaker 303 to output sound that informs the user of a traveling direction of the vehicle 1 and a location where the vehicle 1 is to turn right or left.

The information processing device 10 includes the processor 100 and a memory 120. The processor 100 is a computer configured with a central processing unit (CPU), a micro processing unit (MPU), or other integrated circuits. The memory 120 is a storage device that stores programs or data. The processor 100 may use a volatile random access memory (RAM) as a work area. The RAM may be integrated and implemented into the processor 100, or the memory 120 may include the RAM.

The memory 120 is a rewritable nonvolatile storage device, and stores programs executed by the processor 100 and data processed by the processor 100. The memory 120 is configured by, for example, a semiconductor storage device such as a flash read only memory (ROM) or a solid state disk (SSD), or a magnetic storage device. The memory 120 stores a control program 121, an application 122, and observation information 123.

The control program 121 and the application 122 are programs executed by the processor 100, and are stored in the memory 120 so as to be readable by the processor 100. The control program 121 is a basic control program for the processor 100 to control each unit of the information processing device 10, and is an operating system (OS). The application 122 is an application program executed on the OS.

The processor 100 includes, as function units, an acquisition unit 101, an observation information generation unit 102, an observation information transmission unit 103, a state model acquisition unit 104, an estimation unit 110, and an output control unit 112. These function units are realized when the processor 100 executes the application 122. The application 122 is an example of a program. The information processing device 10 corresponds to an example of the state estimation device with respect to functions related to the state model acquisition unit 104, the estimation unit 110, and the output control unit 112.

The acquisition unit 101 acquires a state variable including an observation value obtained by observing the user U1 while the user U1 is driving the vehicle 1. The state variable includes at least an observation value. Specifically, the observation value includes at least one of the heartbeat interval, the breathing interval, and the pupil diameter of the user U1. The breathing interval is an interval between breaths of the user U1, and is a time value in units of seconds or milliseconds, for example. For example, the acquisition unit 101 executes at least one of calculation of the pupil diameter of the user U1 and detection of the breathing of the user U1, from the captured image data of the camera 311 acquired by the sensor I/F 131. When the breathing of the user U1 is detected, the acquisition unit 101 calculates the breathing interval. Further, for example, the acquisition unit 101 acquires the heartbeat interval, which is the measurement value of the heartbeat sensor 312, as an observation value. At least one of these pupil diameter, breathing interval, and heartbeat interval is included in the state variable. In addition, the state variable may include the amount of operation of the operation unit in the vehicle 1. For example, the acquisition unit 101 may acquire the amount of operation using the operation unit I/F 132, and acquire and generate a state variable including the observation value and the amount of operation.

The observation information generation unit 102 generates, based on the state variable acquired by the acquisition unit 101, observation information of the user U1. The observation information is information including the state variable, and includes information that specifies the vehicle 1 acquiring the state variable, the information processing device 10, or the user U1 who is a target of acquisition of the state variable. The observation information generation unit 102 repeatedly executes a process of generating the state variable at a preset period. The observation information transmission unit 103 transmits the observation information, which is generated by the observation information generation unit 102, to the server 5 using the communication device 301.

The state model acquisition unit 104 acquires a state model 111 from the server 5, as will be described below. The state model 111 is a model that obtains a cognitive load during driving of the user U1, from the state variable acquired by the acquisition unit 101.

The estimation unit 110 includes the state model 111. The state model 111 estimates the state of the user U1 when the state variable acquired by the acquisition unit 101 and the observation information including the state variable is given to the state model 111. The estimation unit 110 estimates the state of the user U1 from the state variable whenever the acquisition unit 101 acquires the state variable or the observation information generation unit 102 generates the observation information, for example.

The state of the user U1 estimated by the estimation unit 110 can be said to be a degree of concentration of the user U1 on driving. In an example to be described below, the estimation unit 110 estimates whether the state of the user U1 is any one of a moderate cognitive load state, a high cognitive load state, and a low cognitive load state.

The inventors have focused on the fact that a person's state of concentration is affected by a person's cognitive load or a cognitive load when a person steers the moving object such as the vehicle 1. The cognitive load refers to a load that is applied to a cognitive function due to person's perception, stimulation received by sense of vision and hearing, or person's movement. The cognitive load state can be said to be an amount of task processing processed by a brain of the user U1. Under the moderate cognitive load state, the amount of task processing is also moderate. On the other hand, the high cognitive load state is a state in which the amount of task processing is large, and the low cognitive load state is a state in which the amount of task processing is small.

When the cognitive load of the user U1 is moderate while the user U1 is driving the vehicle 1, the degree of concentration of the user U1 on the driving is in a moderate state. When the cognitive load of the user U1 while driving is in the high cognitive load state, the user U1 is in a state with an impatient sense, and thus the degree of concentration of the user U1 on the driving decreases. Further, when the cognitive load of the user U1 while driving is in the low cognitive load state, the user U1 is in a distracted state with little stimulation, and thus the degree of concentration of the user U1 on the driving decreases.

Therefore, based on any one of the moderate cognitive load state, the high cognitive load state, and the low cognitive load state as a result of the state of the user U1 estimated by the estimation unit 110, it can be determined whether the degree of concentration of the user U1 on driving is in a moderate state or the degree of concentration is a lower state. The estimation unit 110 can estimate the cognitive load state of the user U1 from the observation information of the user U1, and specify the degree of concentration of the user U1 on driving from the estimated cognitive load state. In other words, it can be said that the estimation unit 110 estimates the degree of concentration of the user U1 on driving.

The output control unit 112 executes an output process based on the result estimated by the estimation unit 110. The output process executed by the output control unit 112 includes a process of causing at least one of the display 302 and the meter panel 304 to display the result estimated by the estimation unit 110. In addition, the output process executed by the output control unit 112 includes a process of adjusting the output to the user U1. Specifically, the output control unit 112 adjusts a volume of the sound output from the speaker 303 and an amount of information displayed on the display 302 or the meter panel 304. For example, when it is estimated that the user U1 is in the high cognitive load state, the output control unit 112 adjusts the output from the display 302, the speaker 303, and the meter panel 304 so as to reduce the cognitive load of the user U1. When it is estimated that the user U1 is in the low cognitive load state, the output control unit 112 adjusts the output from the display 302, the speaker 303, and the meter panel 304 so as to increase the cognitive load of the user U1. A specific example regarding the adjustment of the output will be described below as an operation of an output control unit 212 configured similarly to the output control unit 112.

[1-3. Configuration of Server]

Figure 4:
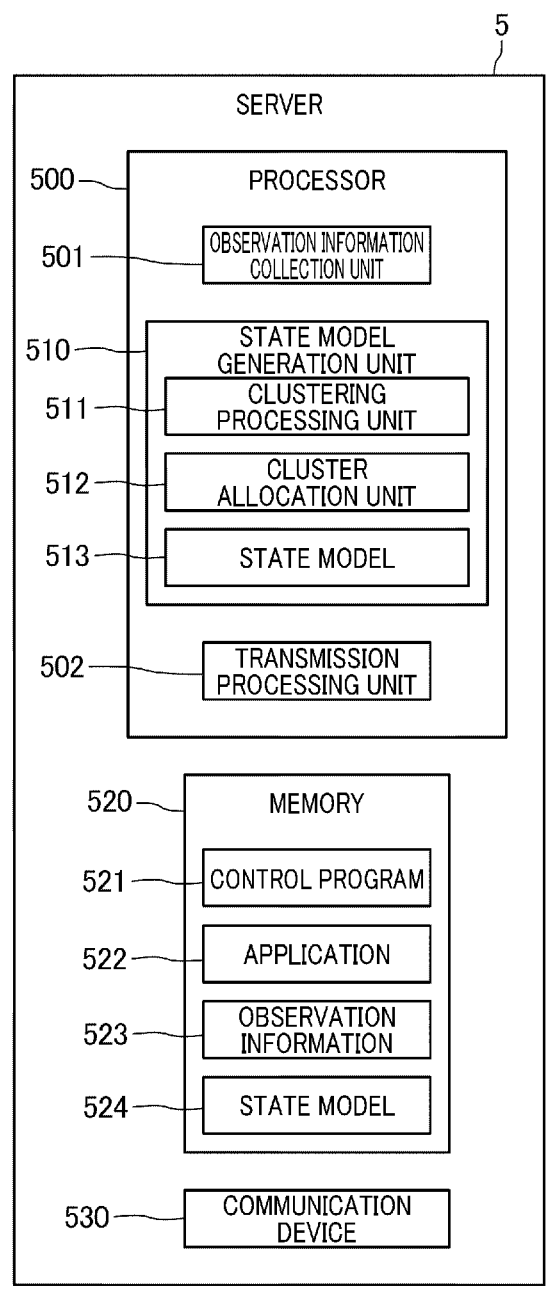
FIG. 4 is a block diagram showing an example of a configuration of a server according to the first embodiment.

FIG. 4 is a block diagram showing an example of a configuration of the server 5.

The server 5 includes a processor 500, a memory 520, and a communication device 530.

The communication device 530 is a wireless communication device including a transmitter that transmits data and a receiver that receives data, and executes cellular communication. The communication device 530 is connected to the communication network NW under control of the processor 500, and executes data communication with the server 5 and the state estimation device 20 through the communication network NW.

The server 5 includes the processor 500 and the memory 520. The processor 500 is a computer configured with a CPU, an MPU, or other integrated circuits. The memory 520 is a storage device that stores programs or data. The processor 500 may use a volatile RAM as a work area. The RAM may be integrated and implemented into the processor 500, or the memory 520 may include the RAM.

The memory 520 is a rewritable nonvolatile storage device, and stores programs executed by the processor 500 and data processed by the processor 500. The memory 520 is configured by, for example, a semiconductor storage device such as a flash ROM or an SSD, or a magnetic storage device. The memory 520 stores a control program 521, an application 522, observation information 523, and a state model 524.

The control program 521 and the application 522 are programs executed by the processor 500, and are stored in the memory 520 so as to be readable by the processor 500. The control program 521 is a basic control program for the processor 500 to control each unit of the server 5, and is an OS. The application 522 is an application program executed on the OS.

The processor 500 includes, as function units, an observation information collection unit 501, a transmission processing unit 502, and a state model generation unit 510. These function units are realized when the processor 500 executes the application 522. The application 522 is an example of a program.

The observation information collection unit 501 acquires the observation information from the information processing device 10. The observation information collection unit 501 can obtain state variables including observation values of the plurality of users U1, respectively, by acquiring the observation information from a plurality of the information processing devices 10 included in the information processing system 1000.

The state model generation unit 510 includes a clustering processing unit 511, a cluster allocation unit 512, and a state model 513. The clustering processing unit 511 executes a process of clustering the plurality of pieces of observation information acquired by the observation information collection unit 501 into a plurality of clusters. The cluster allocation unit 512 executes a process of assigning meaning corresponding to the cognitive load during steering of the user U1, to each of the plurality of clusters subjected to the clustering by the clustering processing unit 511.

The clustering processing unit 511 classifies the plurality of pieces of observation information into a prespecified number of clusters using k-means clustering, a hierarchical clustering method, or other known cluster analysis techniques. In the present embodiment, the observation information is classified into three clusters. The cluster allocation unit 512 associates the high cognitive load state, the low cognitive load state, and the moderate cognitive load state of the user U1 with the three clusters, respectively. The state model 513 is generated by the processing of the clustering processing unit 511 and the cluster allocation unit 512. When the observation information is acquired, the state model 513 classifies the acquired observation information into any one of the three clusters, and obtains a cognitive load state obtained by giving meaning to the classified cluster. In other words, the state model 513 can estimate the cognitive load state of the user U1 from the observation information.

The state model 513 is a model for obtaining the cognitive load of the user U1 from the observation information, and is a learning model that has undergone machine learning, a program, a function, or a parameter that determines the cognitive load of the user U1 from the observation value included in the observation information. The state model generation unit 510 generates the state model 513 that reflects processing results of the clustering processing unit 511 and the cluster allocation unit 512. The state model generation unit 510 generates a state model 524 for transmitting the state model 513 to the information processing device 10 and the state estimation device 20, and causes the memory 520 to store the state model 524.

The transmission processing unit 502 transmits the state model 524, which is generated by the state model generation unit 510, to the information processing device 10 and the state estimation device 20 using the communication device 530. The transmission processing unit 502 corresponds to an example of a transmission processing unit.

[1-4. Configuration of State Estimation Device]

Figure 5:
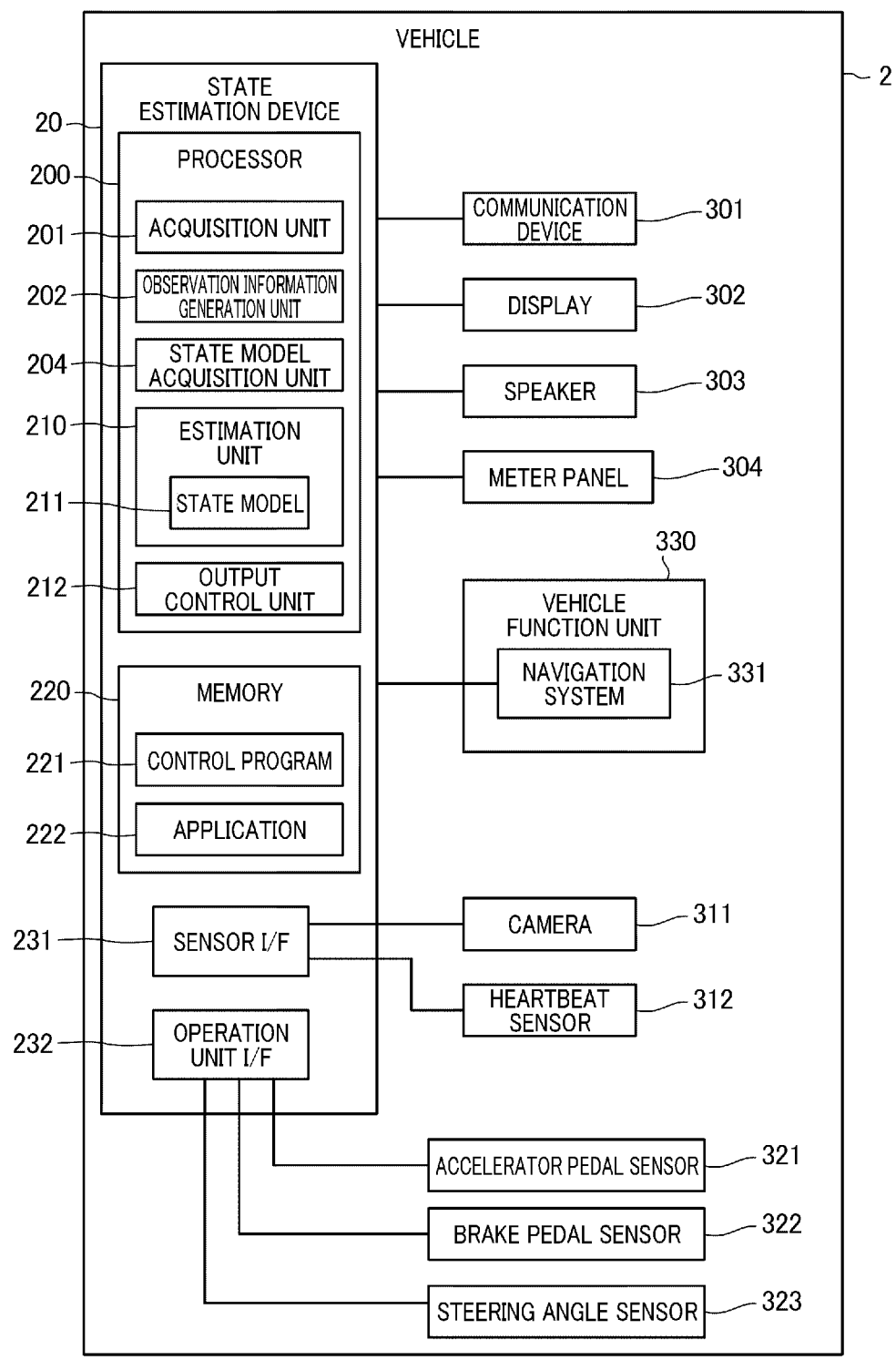
FIG. 5 is a block diagram showing an example of a configuration of a state estimation device according to the first embodiment.

FIG. 5 is a block diagram showing a configuration example of the state estimation device 20 mounted on the vehicle 2.

The state estimation device 20 is a device mounted on the vehicle 2, and is a computer including a processor 200. The state estimation device 20 may be a device fixed to the vehicle 2, or may be a portable device that is temporarily installed in the vehicle 2. An example of the state estimation device 20 to be adopted may include a smartphone, a tablet computer, another type of personal computer, a car navigation device, or a display audio device.

The vehicle 2 mounted with the state estimation device 20 has components common to those of the vehicle 1. For this reason, the components of the vehicle 2 common to those of the vehicle 1 are denoted by the same reference numerals and will not be described.

The state estimation device 20 is connected with a communication device 301, a display 302, a speaker 303, and a meter panel 304 which are mounted on the vehicle 2.

The state estimation device 20 includes a sensor I/F 231 and an operation unit I/F 232. The configuration and function of the sensor I/F 231 are the same as those of the sensor I/F 131, and the configuration and function of the operation unit I/F 232 are the same as those of the operation unit I/F 132. The sensor I/F 231 is connected with a camera 311 and a heartbeat sensor 312. The operation unit I/F 232 is connected with an accelerator pedal sensor 321, a brake pedal sensor 322, and a steering angle sensor 323.

The state estimation device 20 is connected with a vehicle function unit 330 mounted on the vehicle 2. In the vehicle 2, the vehicle function unit 330 is a device having a different function from the state estimation device 20. In the present embodiment, a navigation system 331 is exemplified as the vehicle function unit 330.

The state estimation device 20 includes the processor 200 and the memory 220. The processor 200 is a computer configured with a CPU, an MPU, or other integrated circuits. The memory 220 is a storage device that stores programs or data. The processor 200 may use a volatile RAM as a work area. The RAM may be integrated and implemented into the processor 200, or the memory 220 may include the RAM.

The memory 220 is a rewritable nonvolatile storage device, and stores programs executed by the processor 200 and data processed by the processor 200. The memory 220 is configured by, for example, a semiconductor storage device such as a flash ROM or an SSD, or a magnetic storage device. The memory 220 stores a control program 221 and an application 222.

The control program 221 and the application 222 are programs executed by the processor 200, and are stored in the memory 220 so as to be readable by the processor 200. The control program 221 is a basic control program for the processor 200 to control each unit of the state estimation device 20, and is an OS. The application 222 is an application program executed on the OS.

The processor 500 includes, as function units, an acquisition unit 201, an observation information generation unit 202, a state model acquisition unit 204, an estimation unit 210, and an output control unit 212. These function units are realized when the processor 200 executes the application 222. The application 222 is an example of a program.

The function of the acquisition unit 201 corresponds to that of the acquisition unit 101, the function of the observation information generation unit 202 corresponds to that of the observation information generation unit 102, and the function of the estimation unit 210 corresponds to that of the estimation unit 110. The state model 211 is a state model acquired from the server 5, similarly to the state model 111. The output control unit 212 executes the same processing as the output control unit 112. In other words, the state estimation device 20 has a configuration in which the function of the observation information transmission unit 103 is excluded from the information processing device 10, and does not transmit observation information to the server 5.

The acquisition unit 201 acquires a state variable including an observation value obtained by observing the user U2 while the user U2 is driving the vehicle 2. The observation information generation unit 202 executes a generation process to generate, based on the state variable acquired by the acquisition unit 201, observation information of the user U2. The observation information generation unit 202 repeatedly executes the generation process at a preset period.

The state model acquisition unit 204 acquires the state model 211 from the server 5. The state model 211 is similar to the state model 111, and is a model having a correlation between the state variable acquired by the acquisition unit 201 and the cognitive load during driving of the user U2.

The estimation unit 210 includes the state model 211, and estimates the state of the user U2 using the state model 211 from the state variable acquired by the acquisition unit 201. The estimation unit 210 estimates the state of the user U2 whenever the acquisition unit 201 acquires the state variable. For example, the estimation unit 210 estimates whether the state of the user U2 is any one of a moderate cognitive load state, a high cognitive load state, and a low cognitive load state.

The output control unit 212 executes an output process based on a result estimated by the estimation unit 210. The output process executed by the output control unit 212 includes a process of causing at least one of the display 302 and the meter panel 304 to display the result estimated by the estimation unit 210. In addition, the output process executed by the output control unit 212 includes a process of adjusting the output to the user U2. Specifically, the output control unit 212 adjusts a volume of the sound output from the speaker 303 and an amount of information displayed on the display 302 or the meter panel 304.

[1-5. Operation of Information Processing System]
[1-5-1. Overall Operation]

Figure 6:
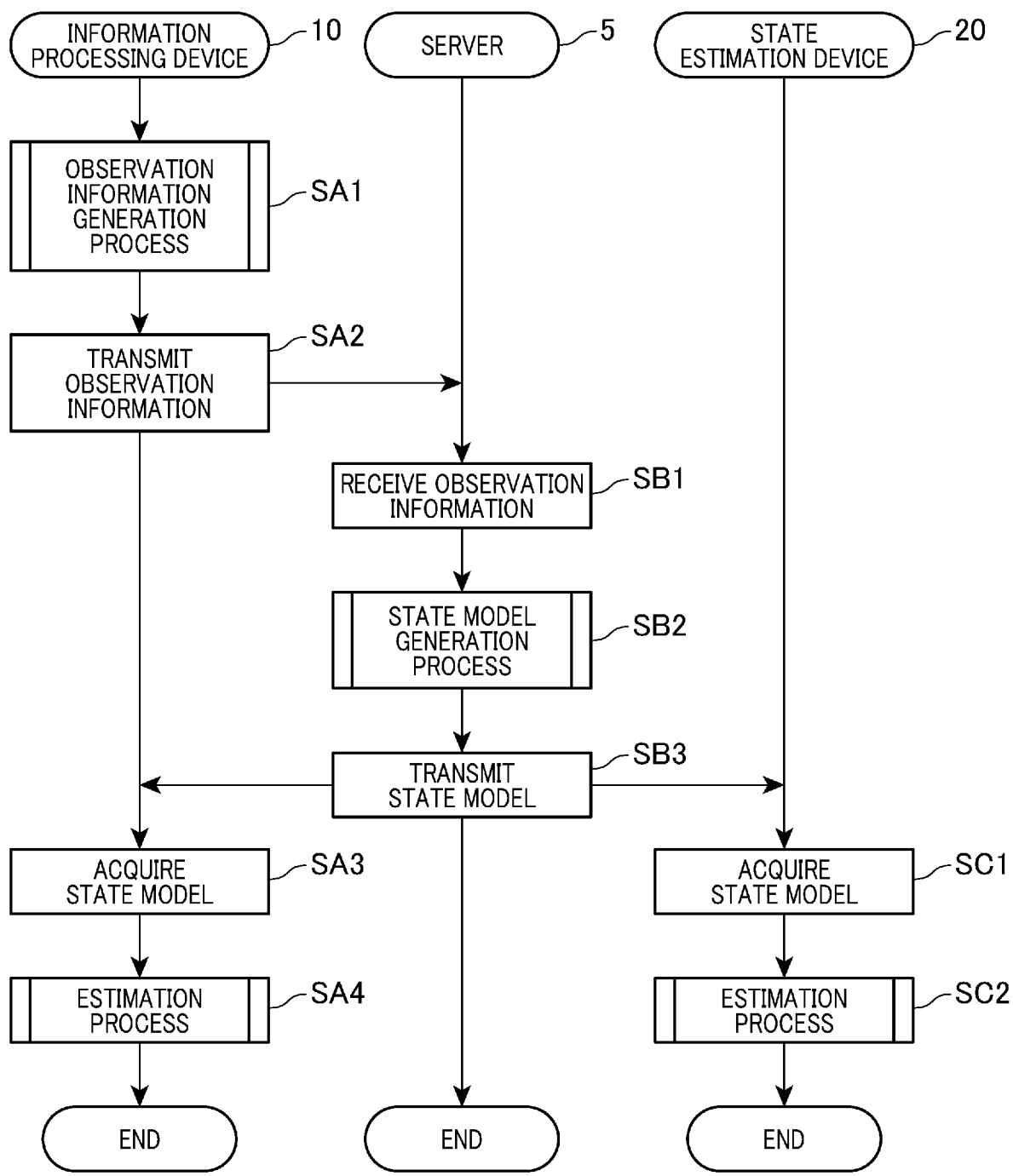
FIG. 6 is a sequence diagram showing an example of an operation of the information processing system according to the first embodiment.

FIG. 6 is a sequence diagram showing an example of an operation of the information processing system 1000.

Steps SA1 to SA4 are operations of the information processing device 10, steps SB1 to SB3 are operations of the server 5, and steps SC1 and SC2 are operations of the state estimation device 20.

The information processing device 10 executes an observation information generation process using the acquisition unit 101 and the observation information generation unit 102 (step SA1). The information processing device 10 transmits observation information generated by the observation information generation process to the server 5 using the observation information transmission unit 103 (step SA2). The plurality of information processing devices 10 may execute the operations of steps SA1 and SA2 in parallel. For example, the information processing device 10 mounted on the vehicle 1A and the information processing device 10 mounted on the vehicle 1B can execute steps SA1 and SA2, respectively.

The server 5 uses the observation information collection unit 501 to receive the observation information transmitted by the information processing device 10 (step SB1), and uses the state model generation unit 510 to execute a state model generation process (step SB2). Here, the server 5 may wait while repeating the operation of step SB1 until receiving a sufficient number of pieces of observation information to execute the state model generation process.

The server 5 transmits the state model 524, which is generated by the state model generation unit 510, to the information processing device 10 and the state estimation device 20 using the transmission processing unit 502 (step SB3).

The state estimation device 20 uses the state model acquisition unit 204 to acquire the state model transmitted by the server 5 (step SC1). The state estimation device 20 loads the acquired state model 211 into the estimation unit 210, and executes an estimation process using the estimation unit 210 (step SC2).

The information processing device 10 uses the state model acquisition unit 104 to acquire the state model transmitted by the server 5 (step SA3). The information processing device 10 loads the acquired state model 111 into the estimation unit 110, and executes an estimation process using the estimation unit 110 (step SA4).

Hereinafter, the observation information generation process (step SA1), the state model generation process (step SB2), and the estimation process (step SA4 or SC2) will be described in detail.

[1-5-2. Generation of Observation Information]

Figure 7:
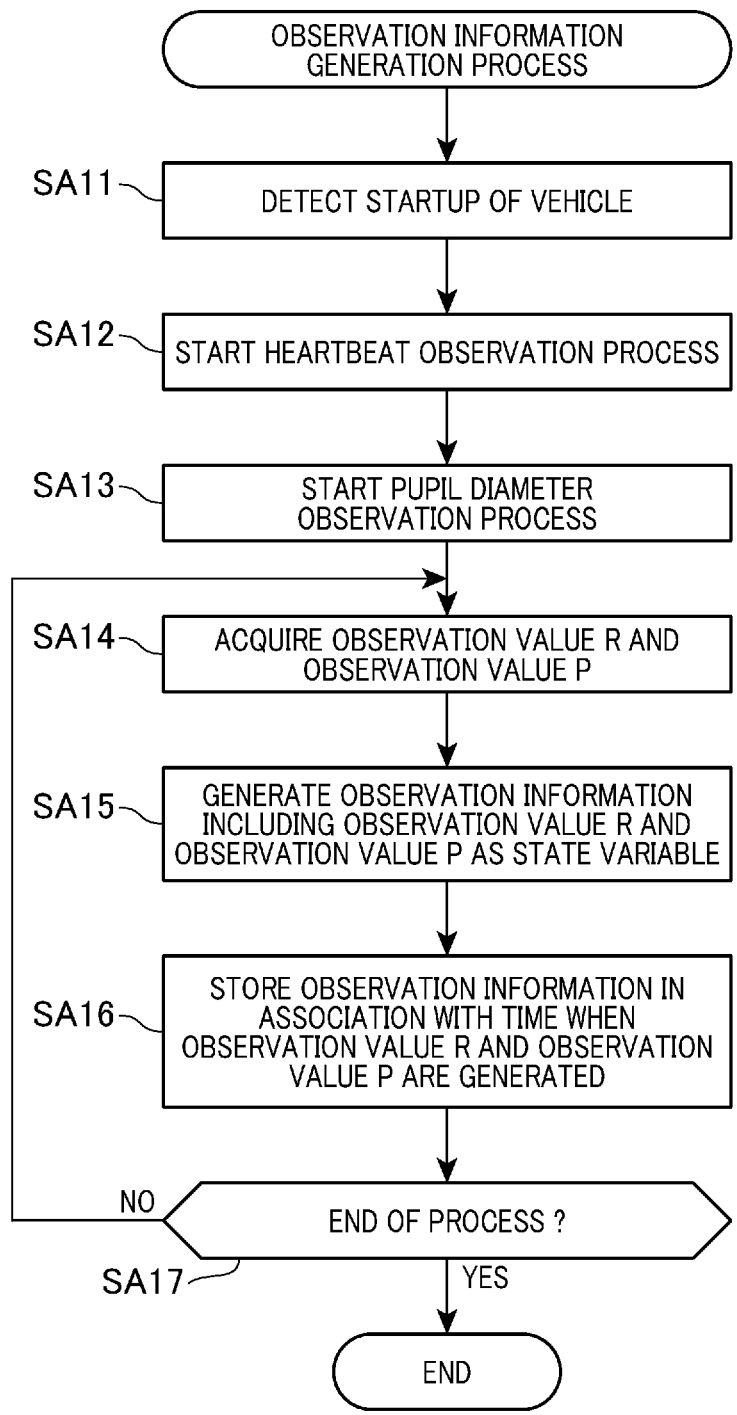
FIG. 7 is a flowchart showing an example of an operation of the information processing device according to the first embodiment.

FIG. 7 is a flowchart showing an example of an operation of the information processing device 10, and shows details of the observation information generation process. In FIG. 7, steps SA11 to SA14 are executed by the acquisition unit 101, and steps SA15 to SA17 are executed by the observation information generation unit 102.

Upon detecting a startup of the vehicle 1 (step SA11), the information processing device 10 starts a heartbeat observation process (step SA12), and starts a pupil diameter observation process (step SA13). Steps SA12 and SA13 may be performed in a reverse order or at the same time. The startup of the vehicle 1 indicates that a control system of the vehicle 1 starts to operate from a stop state, for example, that an ignition switch of the vehicle 1 is turned on or a system power of the vehicle 1 is turned on.

Figure 8:
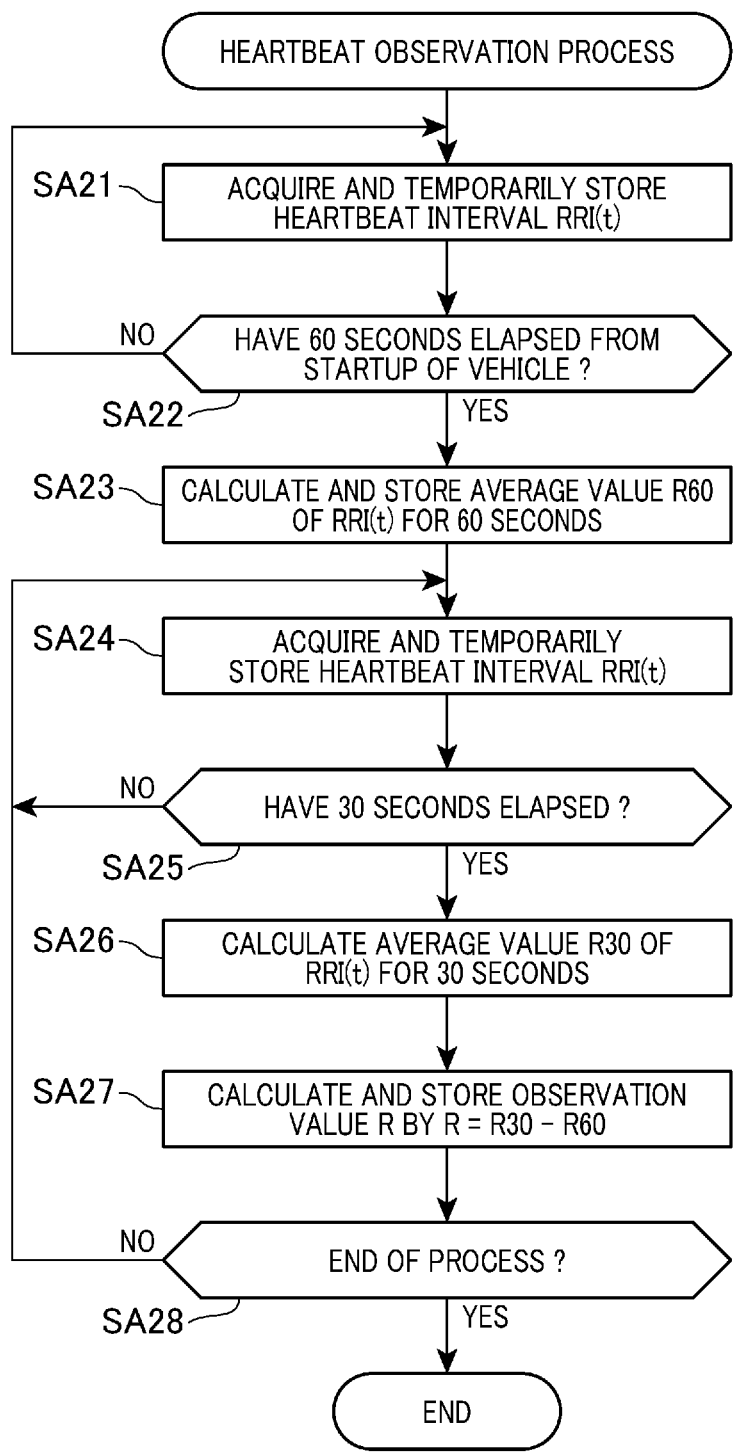
FIG. 8 is a flowchart showing an example of the operation of the information processing device according to the first embodiment.

FIG. 8 is a flowchart showing an example of operation of the information processing device 10, and shows the heartbeat observation process. Steps SA21 to SA28 are executed by the acquisition unit 101.

As described above, the heartbeat sensor 312 detects the heartbeat of the user U1 at a preset measurement period, calculates the heartbeat interval whenever the heartbeat is detected, and outputs the heartbeat interval as a measurement result. The heartbeat sensor 312 may calculate an average value of the heartbeat intervals over the preset predetermined time, and output the average value of the heartbeat intervals as a measurement value. The information processing device 10 acquires the measurement value of the heartbeat sensor 312 after detecting the startup of the vehicle 1, and temporarily stores the acquired measurement value in the memory 120 as a heartbeat interval RRI(t) (step SA21). The heartbeat interval RRI(t) is data in which the measurement value of the heartbeat sensor 312 is associated with time. Such a time is a measurement time at which the heartbeat sensor 312 performs measurement or a time when the information processing device 10 acquires the measurement value, and can be called an observation time. The information processing device 10 determines whether 60 seconds have elapsed from the startup of the vehicle 1 (YES in step SA22), and the process returns to step SA21 when it is determined that 60 seconds have not elapsed (NO in step SA22). When 60 seconds have elapsed from the startup of the vehicle 1 (step SA22), the information processing device 10 makes a transition to step SA23. In step SA23, the information processing device 10 calculates a value R60, which is the average value of the heartbeat interval RRI(t) for 60 seconds from the startup of the vehicle 1 (step SA23).

Subsequently, similarly to step SA21, the information processing device 10 acquires the measurement value of the heartbeat sensor 312, and temporarily stores the acquired measurement value in the memory 120 as the heartbeat interval RRI(t) (step SA24). The operation of step SA24 may be started immediately after step SA22. The information processing device 10 determines whether 30 seconds have elapsed from the start of acquiring the heartbeat interval RRI(t) (step SA25), and the process returns to step SA24 when 30 seconds have not elapsed (NO in step SA25). When 30 seconds have elapsed from the start of acquiring the heartbeat interval RRI(t) (YES in step SA25), the information processing device 10 makes a transition to step SA26.

In step SA26, the information processing device 10 calculates a value R30, which is an average value of the heartbeat intervals RRI(t) for 30 seconds temporarily stored in the memory 120 (step SA26). The information processing device 10 calculates a difference by subtracting the value R60 from the value R30, and stores the calculated value in the memory 120 as an observation value R (step SA27).

As described above, in steps SA21 to SA23, the average value R60 of the heartbeat intervals of the user U1 is calculated for 60 seconds at the first time after the startup of the vehicle 1. In steps SA24 to SA26, the average value R30 of the heartbeat intervals of the user U1 is calculated every 30 seconds after 60 seconds have elapsed from the startup of the vehicle 1. Then, the information processing device 10 calculates the difference between the value R30 and the value R60 whenever calculating the average value R30, and sets the calculated difference as the observation value R. Therefore, the observation value R is calculated every 30 seconds after 90 seconds have elapsed from the startup of the vehicle 1, and the calculated observation values R are sequentially accumulated in the memory 120.

The information processing device 10 determines whether to end the heartbeat observation process (step SA28). When conditions for ending the heartbeat observation process are satisfied, for example, when the control system of the vehicle 1 stops or when the user U1 performs an operation related to the end of the heartbeat observation process (YES in step SA28), the information processing device 10 ends the process of FIG. 8. When the information processing device 10 does not end the process (NO in step SA28), the process returns to step SA24.

Figure 9:
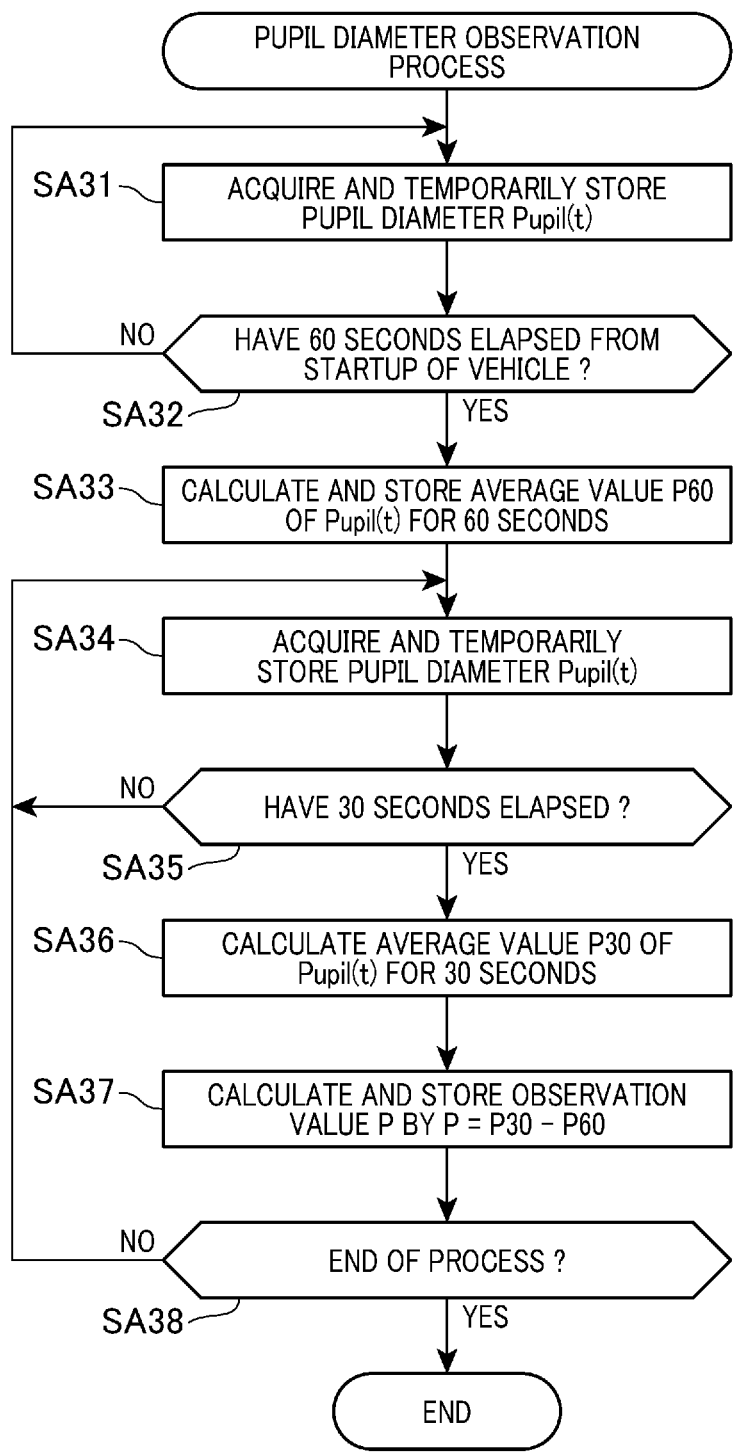
FIG. 9 is a flowchart showing an example of the operation of the information processing device according to the first embodiment.

FIG. 9 is a flowchart showing an example of the operation of the information processing device 10, and shows the pupil diameter observation process. Steps SA31 to SA38 are executed by the acquisition unit 101.

The acquisition unit 101 measures the pupil diameter of the user U1 by analyzing the captured image data of the camera 311. For example, the acquisition unit 101 extracts images of eyes of the user U1 from the captured image data of the camera 311, and calculates the pupil diameter by comparing the outline of the eye and the size of the pupil in the extracted image. The acquisition unit 101 measures the pupil diameter at a preset measurement period, and outputs a measurement result of the pupil diameter every measurement.

The information processing device 10 acquires the measurement value of the pupil diameter after detecting the startup of the vehicle 1, and temporarily stores the acquired measurement value in the memory 120 as a pupil diameter Pupil(t) (step SA31). The pupil diameter Pupil(t) is data in which the measurement value of the pupil diameter is associated with time. Such a time is a measurement time at which the pupil diameter is measured or a time when the information processing device 10 acquires the measurement value, and can be called an observation time. The information processing device 10 determines whether 60 seconds have elapsed from the startup of the vehicle 1 (YES in step SA32), and the process returns to step SA31 when 60 seconds have not elapsed (NO in step SA32). When 60 seconds have elapsed from the startup of the vehicle 1 (step SA32), the information processing device 10 makes a transition to step SA33. In step SA33, the information processing device 10 calculates a value P60, which is the average value of the pupil diameter Pupil(t) for 60 seconds from the startup of the vehicle 1 (step SA33).

Subsequently, similarly to step SA31, the information processing device 10 acquires the measurement value of the pupil diameter, and temporarily stores the acquired measurement value in the memory 120 as the pupil diameter Pupil(t) (step SA34). The operation of step SA34 may be started immediately after step SA32. The information processing device 10 determines whether 30 seconds have elapsed from the start of acquiring the pupil diameter Pupil(t) (step SA35), and the process returns to step SA34 when 30 seconds have not elapsed (NO in step SA35). When 30 seconds have elapsed from the start of acquiring the pupil diameter Pupil(t) (YES in step SA35), the information processing device 10 makes a transition to step SA36.

In step SA36, the information processing device 10 calculates a value P30, which is an average value of the pupil diameter Pupil(t) for 30 seconds temporarily stored in the memory 120 (step SA36). The information processing device 10 calculates a difference by subtracting the value P60 from the value P30, and stores the calculated value in the memory 120 as an observation value P (step SA37).

As described above, in steps SA31 to SA33, the average value P60 of the pupil diameters of the user U1 is calculated for 60 seconds at the first time after the startup of the vehicle 1. In steps SA34 to SA36, the average value P30 of the pupil diameters of the user U1 is calculated every 30 seconds after 60 seconds have elapsed from the startup of the vehicle 1. Then, the information processing device 10 calculates the difference between the value P30 and the value P60 whenever calculating the average value P30, and sets the calculated difference as the observation value P. Therefore, the observation value P is calculated every 30 seconds after 90 seconds have elapsed from the startup of the vehicle 1, and the calculated observation values P are sequentially accumulated in the memory 120.

The information processing device 10 determines whether to end the pupil diameter observation process (step SA38). When conditions for ending the pupil diameter observation process are satisfied, for example, when the control system of the vehicle 1 stops or when the user U1 performs an operation related to the end of the pupil diameter observation process (YES in step SA38), the information processing device 10 ends the process of FIG. 9. When the information processing device 10 does not end the process (NO in step SA38), the process returns to step SA34.

In FIG. 7, the information processing device 10 acquires the observation value R and the observation value P (step SA14). In step SA14, the information processing device 10 acquires the observation value R and the observation value P stored in the memory 120, and thus step SA14 can be executed even when either the heartbeat observation process (FIG. 8) or the pupil diameter observation process (FIG. 9) is being executed.

The information processing device 10 generates observation information including, as state variables, the observation value R and the observation value P acquired in step SA14 (step SA15). In the present embodiment, the state variable includes the two observation values R and P, but the state variable may include three or more observation values. The information processing device 10 stores the generated observation information in the memory 120 in association with the time when either or both of the observation value R and the observation value P is generated (step SA16). In step SA16, the information processing device 10 may store the observation information in association with the time when the observation information is generated. The information processing device 10 determines whether to end the observation information generation process (step SA17). When conditions for ending the observation information generation process are satisfied, for example, when the control system of the vehicle 1 stops (YES in step SA17), the information processing device 10 ends the process of FIG. 7. When the information processing device 10 does not end the process (NO in step SA17), the information processing device 10 makes a return to step SA14.

By the operations shown in FIGS. 7, 8, and 9, the observation information of the user U1 is generated in one vehicle 1. Such operations are executed by the information processing device 10 in a plurality of vehicles 1, and thus the observation information is generated for a plurality of users U1. The generated observation information is stored in the memory 120 in association with the time. Therefore, a plurality of pieces of observation information at different times are generated for one user U1 and accumulated in the memory 120.

[1-5-3. Generation of State Model]

Figure 10:
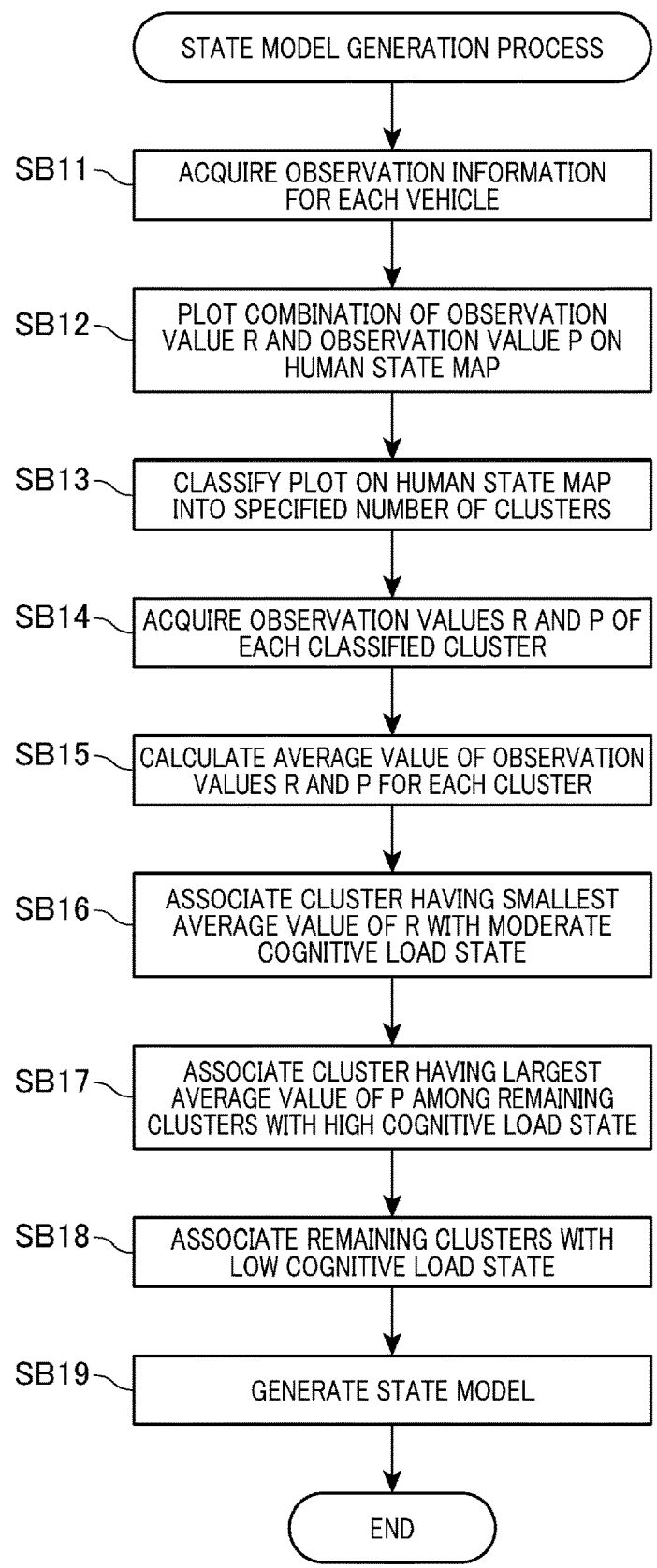
FIG. 10 is a flowchart showing an example of an operation of the server according to the first embodiment.
Figure 11:
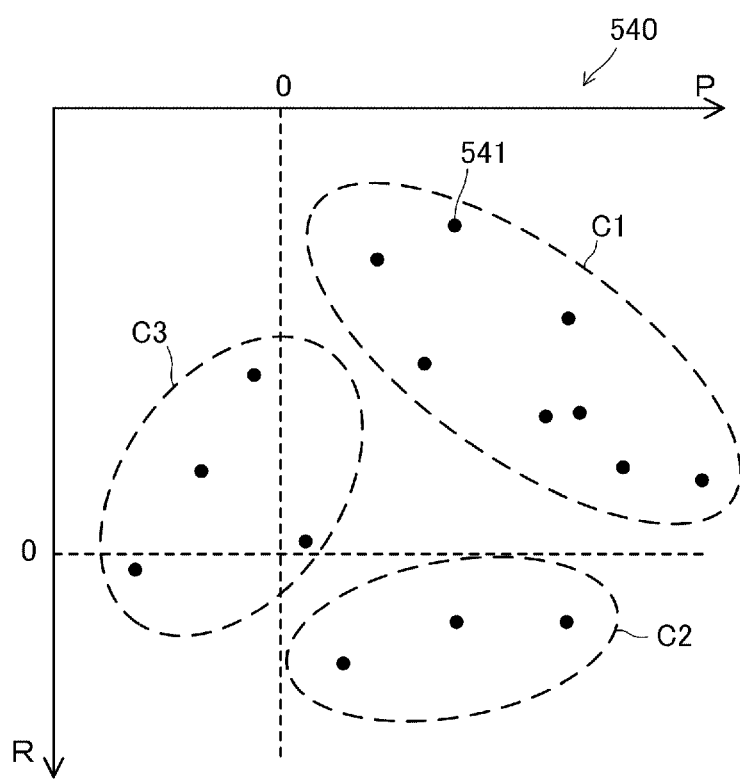
FIG. 11 is a schematic diagram showing an example of a human state map according to the first embodiment.

FIG. 10 is a flowchart showing an example of an operation of the server 5, and shows details of the state model generation process. In FIG. 10, step SB11 is executed by the observation information collection unit 501, steps SB12 and SB13 are executed by the clustering processing unit 511, and steps SB13 to SB19 are executed by the cluster allocation unit 512. FIG. 11 is a schematic diagram showing an example of a human state map 540 in the state model generation process.

The server 5 acquires observation information for each vehicle from each of the vehicles 1 (step SB11). For example, the server 5 executes a process of acquiring observation information from the vehicle 1A and a process of acquiring observation information from the vehicle 1B. The server 5 extracts an observation value R and an observation value P from the acquired observation information, and plots the observation value R and the observation value P on the human state map 540 (step SB12). The human state map 540 is a map schematically showing the operation of the clustering processing unit 511, and data corresponding to the human state map 540 is actually stored in the memory 520.

The human state map 540 is a two-dimensional map corresponding to the fact that the state variable included in the observation information includes two observation values R and P, as shown in FIG. 11 as an example. In the example of FIG. 11, a horizontal axis indicates the observation value P, a vertical axis indicates the observation value R, and one piece of observation information is arranged as one plot 541. For example, when the server 5 acquires 10 pieces of observation information at different times from each of the two vehicles 1A and 1B, 20 pieces of observation information are plotted on the human state map 540.

The server 5 executes a clustering process on the plot 541 on the human state map 540, and classifies the plot 541 into a specified number of clusters (step SB13). In the present embodiment, the number of clusters is designated as three. As a specific classification method, as described above, the k-means clustering, the hierarchical clustering method, or other known cluster analysis techniques can be used.

The server 5 acquires the observation value R and the observation value P of the observation information included in each cluster classified in step SB13 (step SB14). The server 5 calculates, for each cluster, an average value of the observation values R and an average value of the observation values P acquired in step SB14 (step SB15).

The server 5 associates the cluster having the smallest average value of the observation values R with a moderate cognitive load state (step SB16). Thus, a meaning of the cognitive load state is assigned to one cluster.

Subsequently, the server 5 associates the cluster having the largest average value of the observation values P, among the remaining clusters not assigned with meaning, with a high cognitive load state (step SB17). Further, the server 5 associates the remaining clusters not assigned with meaning with a low cognitive load state (step SB18). In steps SB16 to SB18, meanings of the cognitive load states are assigned to three clusters.

FIG. 11 shows three clusters C1, C2, and C3 classified by the clustering processing unit 511. The cluster C1 is associated with a moderate cognitive load state, the cluster C2 is associated with a low cognitive load state, and the cluster C3 is associated with a high cognitive load state.

The server 5 generates the state model 513 (step SB19). When new observation information is input to the state model 513, the state model 513 determines which of the clusters C1, C2, and C3 the input observation information belongs to, and outputs the cognitive load state, to which the meaning is assigned to the determined cluster, as a determination result. Therefore, the output of the state model 513 is any one of the moderate cognitive load state, the high cognitive load state, and the low cognitive load state.

The state model 513 is, for example, a learned model that has been subjected to machine learning for the correlation between the clusters C1, C2, and C3 and the observation value R and the observation value P included in each of the clusters, and is a so-called artificial intelligence (AI). In this case, the clustering process performed by the clustering processing unit 511 in steps SB12 and SB13 corresponds to unsupervised learning, which is a type of machine learning. The process of steps SB14 to SB18 corresponds to a process of setting output data of the learned model. Further, the state model 513 may be a program, a function, or a parameter such as a threshold value that determines the cognitive load state from the observation value R and the observation value P.

The state model 513 generated in step SB19 is stored in the memory 520 as a state model 524 such that the server 5 transmits it to the information processing device 10 and the state estimation device 20. The state model 524 is the state model 513 itself, or a program or data used for the information processing device 10 and the state estimation device 20 to generate a model similar to the state model 513. Then, the state model 524 is transmitted to the information processing device 10 and the state estimation device 20 in step SB3 of FIG. 6, and thus the information processing device 10 and the state estimation device 20 can execute the estimation process.

The server 5 executes the state model generation process shown in FIG. 10 at a predetermined timing. For example, the server 5 executes the state model generation process when the number of pieces of the observation information received from the information processing device 10 is equal to or greater than a preset threshold value. In addition, the server 5 executes the state model generation process whenever the set number of pieces of the observation information is received from the information processing device 10 or whenever a set time elapses after the state model 513 is generated. In this case, the server 5 updates the state model 513, which is already generated, and transmits the state model 524 corresponding to the updated state model 513 to the information processing device 10 and the state estimation device 20.

[1-5-4. Estimation Process]

Figure 12:
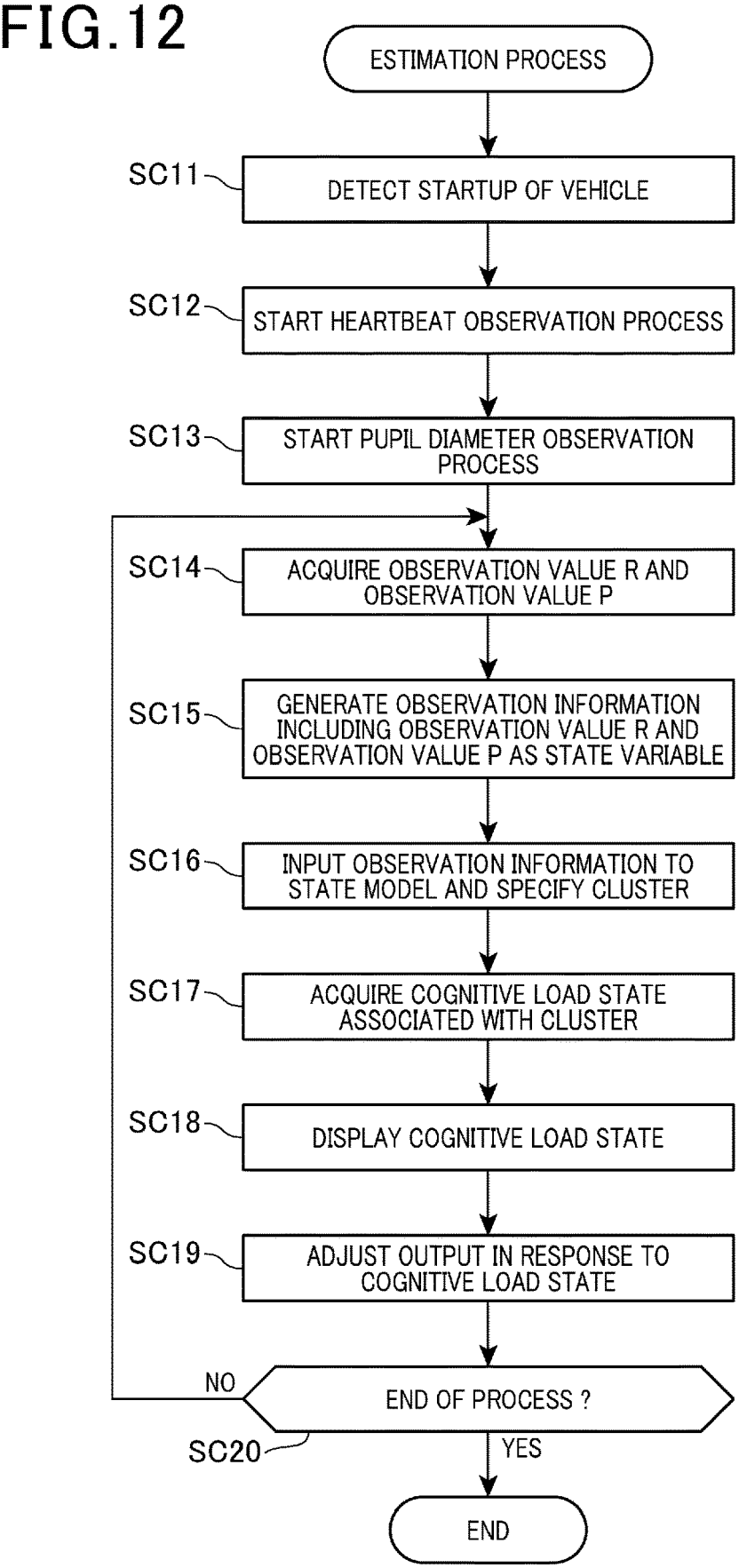
FIG. 12 is a flowchart showing an example of an operation of the state estimation device according to the first embodiment.

FIG. 12 is a flowchart showing an example of an operation of the state estimation device 20, and shows details of the estimation process. The estimation process can be executed by both of the information processing device 10 and the state estimation device 20, as shown in FIG. 6. The estimation process will be described below that is executed by the state estimation device 20 in step SC2, but the estimation process may also be executed by the information processing device 10, similarly.

Steps SC11 to SC14 are executed by the acquisition unit 201, step SC15 is executed by the observation information generation unit 202, and step SC16 is executed by the estimation unit 210. Steps SC17 to SC19 are executed by the output control unit 212.

Upon detecting a startup of the vehicle 2 (step SC11), the state estimation device 20 starts a heartbeat observation process (step SC12), and starts a pupil diameter observation process (step SC13). Steps SC12 and SC13 may be performed in a reverse order or at the same time. Operations of steps SC11 to SC13 are similar to those of steps SA11 to SA13 shown in FIG. 7.

The state estimation device 20 acquires the observation value R and the observation value P (step SC14). In step SC14, the state estimation device 20 acquires the observation value R and the observation value P stored in the memory 220, and thus step SC14 can be executed even when either the heartbeat observation process (FIG. 8) or the pupil diameter observation process (FIG. 9) is being executed.

The state estimation device 20 generates observation information including, as state variables, the observation value R and the observation value P acquired in step SC14 (step SC15). The state estimation device 20 inputs the observation information generated in step SC15 to the state model 211, thereby determining a cluster to which the observation information belongs (step SC16). The state estimation device 20 acquires a cognitive load state associated with the determined cluster (step SC17). Specifically, the state estimation device 20 acquires, as an estimation result, any one of a moderate cognitive load state, a high cognitive load state, and a low cognitive load state.

The state estimation device 20 displays the cognitive load state acquired in step SC17 (step SC18). In step SC18, the degree of concentration of the user U2 determined from the cognitive load state may be displayed. For example, the state estimation device 20 displays characters or images indicating the cognitive load state or the degree of concentration on driving of the user U2 on either or both of the display 302 and the meter panel 304.

Figure 13:
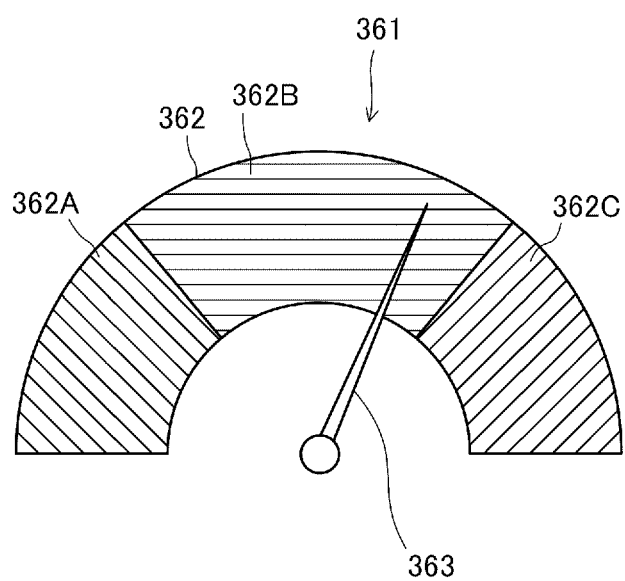
FIG. 13 is a view showing an example of a state display unit according to the first embodiment.

FIG. 13 is a view showing an example of a state display unit 361 displayed on the meter panel 304 by the output control unit 212. The state display unit 361 is displayed on a liquid crystal panel provided on the meter panel 304, for example.

The state display unit 361 includes a needle-shaped indicator 363 and a gauge 362 arranged within a moving range of the indicator 363. The gauge 362 has a circular arc shape, and the indicator 363 rotatably moves along the gauge 362. The gauge 362 and the indicator 363 are images displayed on a liquid crystal panel, for example.

The gauge 362 is divided into three regions 362A, 362B, and 362C, and each of the regions 362A, 362B, and 362C is painted in a different color. The region 362A indicates that the cognitive load state of the user U2 is low, that is, the low cognitive load state. The region 362B indicates that the user U2 is in a moderate cognitive load state, and the region 362C indicates that the user U2 is in a high cognitive load state. Each of the regions 362A, 362B, and 362C may be painted in a different color to remind of a cognitive load state corresponding to each of the regions. Further, each of the regions 362A, 362B, and 362C may be appended with characters indicating the cognitive load state corresponding to each of the regions, or characters indicating the task processing amount corresponding to the cognitive load state of each of the regions.

The output control unit 212 causes the state display unit 361 to display, and thus can display the cognitive load state of the user U2, the task processing amount, or the degree of concentration on driving based on the position of the indicator 363 on the gauge 362.

The state estimation device 20 adjusts the output of the state estimation device 20 in response to the cognitive load state after step SC18 or in parallel with step SC18 (step SC19). In step SC19, the output from the device provided in the vehicle 2 to the user U2 is adjusted. Specifically, the state estimation device 20 uses the output control unit 212 to adjust the volume of the sound output from the speaker 303, display luminance of the display 302 or the meter panel 304, and the amount of information to be displayed.

When the user U2 is in the high cognitive load state, the output control unit 212 adjusts the output so as to reduce the cognitive load of the user U2. For example, the output control unit 212 executes a process of reducing the volume of the sound output from the speaker 303, a process of reducing the display luminance (brightness) of the display 302, and a process of reducing the display luminance (brightness) of the meter panel 304. Through these processes, it is possible to reduce intensity of external stimulation applied to the user U2, and it is possible to prevent an increase in the cognitive load of the user U2 or to reduce the cognitive load.

For example, the output control unit 212 reduce the amount of information output to the user U2 by the vehicle 1 in order to reduce the cognitive load of the user U2. Specifically, the output control unit 212 reduces chances of outputting sound from the speaker 303. When the state estimation device 20 performs control to output the sound from the speaker 303 based on data input from the navigation system 331, the output control unit 212 thins out the data used for the output of the sound, thereby reducing the number of times or frequency of sound output from the speaker 303. The output control unit 212 may output an instruction to the navigation system 331 to reduce the number of times or frequency of sound output.

Further, for example, the output control unit 212 reduce the amount of information displayed on the display 302 and the meter panel 304 in order to reduce the cognitive load of the user U2. When the state estimation device 20 performs control to cause the display 302 to display the information based on data input from the navigation system 331, the output control unit 212 thins out the data used for the display, thereby reducing the amount of information to be displayed. Further, the output control unit 212 may output an instruction to the navigation system 331 to reduce the amount of information to be displayed. In addition, the output control unit 212 may cause the meter panel 304 to stop a display of low importance regarding the driving of the vehicle 1.

When it is estimated that the user U2 is in the low cognitive load state, the output control unit 212 executes an output process to increase the cognitive load of the user U2. For example, the output control unit 212 executes a process of increasing the volume of the sound output from the speaker 303, a process of increasing the display luminance (brightness) of the display 302, and a process of increasing the display luminance (brightness) of the meter panel 304. Through these processes, it is possible to increase intensity of external stimulation applied to the user U2, and it is possible to prevent a decrease in the cognitive load of the user U2 or to increase the cognitive load. For example, the output control unit 212 increases the amount of information output to the user U2 by the vehicle 1. Specifically, the output control unit 212 increases the chances of outputting sound from the speaker 303. In this case, the output control unit 212 may output an instruction to the navigation system 331 to increase the number of times or frequency of sound output. Further, the output control unit 212 may increase the amount of information displayed on the display 302 and the meter panel 304. Specifically, the output control unit 212 may output an instruction to the navigation system 331 to increase the amount of information to be displayed. Further, the output control unit 212 may cause the meter panel 304 to display many displays of low importance regarding the driving of the vehicle 1.

When it is estimated that the user U2 is in the moderate cognitive load state, the output control unit 212 executes an output process to prevent fluctuations in the cognitive load of the user U2. For example, the output control unit 212 executes a process of preventing changes in the volume of the sound output from the speaker 303, a process of preventing changes in the display luminance (brightness) of the display 302, and a process of preventing changes in the display luminance (brightness) of the meter panel 304. Specifically, when a process or operation is performed to increase or reduce the volume of the sound output from the speaker 303 beyond a preset range, the output control unit 212 makes an amount of change in the volume smaller than the amount of change corresponding to the process or operation. Through these processes, it is possible to prevent changes in external stimulation applied to the user U2, and it is possible to maintain the cognitive load of the user U2 at the moderate cognitive load state. In this case, the output control unit 212 may prevent, for example, an increase or decrease in chances of outputting sound from the speaker 303, or a change in the amount of information to be displayed on the display 302 or the meter panel 304.

The state estimation device 20 determines whether to end the estimation process (step SC20). When conditions for ending the estimation process are satisfied, for example, when the control system of the vehicle 1 stops (YES in step SC20), the state estimation device 20 ends the process of FIG. 12. When the state estimation device 20 does not end the process (NO in step SC20), the state estimation device 20 makes a return to step SC14.

The state estimation device 20 repeatedly executes steps SC14 to SC20, thereby acquiring new observation values R and observation values P every 30 seconds, for example. For this reason, the estimation result of the cognitive load state of the user U2 is updated every 30 seconds, and the display of the cognitive load state (step SC18) and the adjustment of the output (step SC19) are performed based on the updated estimation result.

As described above, the estimation process described with reference to FIGS. 12 and 13 can be executed not only by the state estimation device 20, but also by the information processing device 10 using the estimation unit 110 and the output control unit 112. Thereby, it is possible to estimate the state of the user U1, display the cognitive load state according to the estimation result regarding the user U1, and adjust the output corresponding to the cognitive load state of the user U1. Then, the information processing device 10 and the state estimation device 20 include the output control units 112 and 212, respectively, and thus correspond to an example of a control device.

2. Second Embodiment

[2-1. Configuration of Information Processing System]

Figure 14:
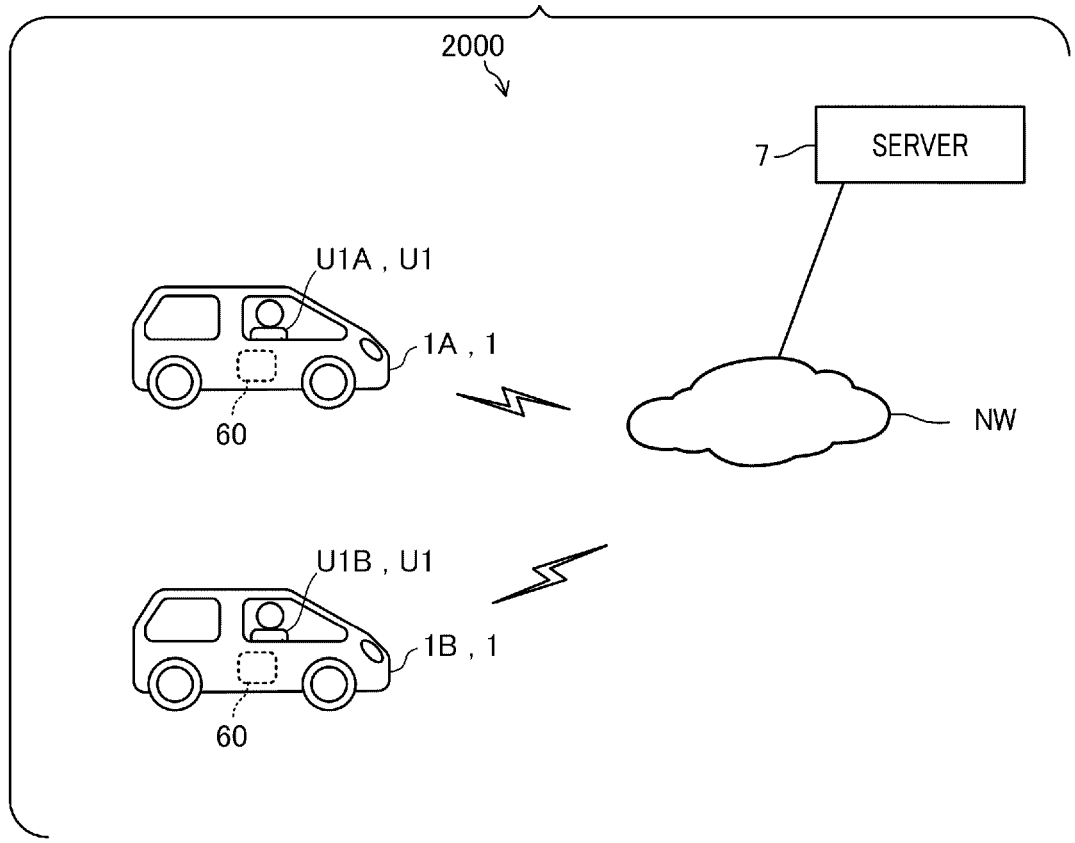
FIG. 14 is a diagram showing an example of a configuration of an information processing system according to a second embodiment.

FIG. 14 is a diagram showing a configuration of an information processing system 2000.

The information processing system 2000 includes an information processing device 60 mounted on a vehicle 1 and a server 7. The server 7 is connected to the information processing device 60 via a communication network NW so as to be capable of being in data communication with each other. FIG. 14 shows, as an example, a configuration in which the information processing system 2000 includes information processing devices 60 mounted on two vehicles 1A and 1B, respectively, but there is no limit on the number of information processing devices 60 included in the information processing system 2000. In the following description, the vehicles 1A and 1B will be referred to as a vehicle 1 unless otherwise distinguished.

In the configuration of the information processing system 2000 to be described below, the same components as in the first embodiment described above are denoted by the same reference numerals, and will not be described. For example, the configurations of the vehicle 1 and the communication network NW are as described above. Further, the configuration of the vehicle 1 is common to the configuration shown in FIG. 3, for example.

The server 7 is a computer that transmits and receives data to and from the information processing device 60. The server 7 may be a single server computer, may be configured by a plurality of server computers, or may be a cloud server. The server 7 corresponds to an example of a management device.

[2-2. Configuration of Information Processing Device]

Figure 15:
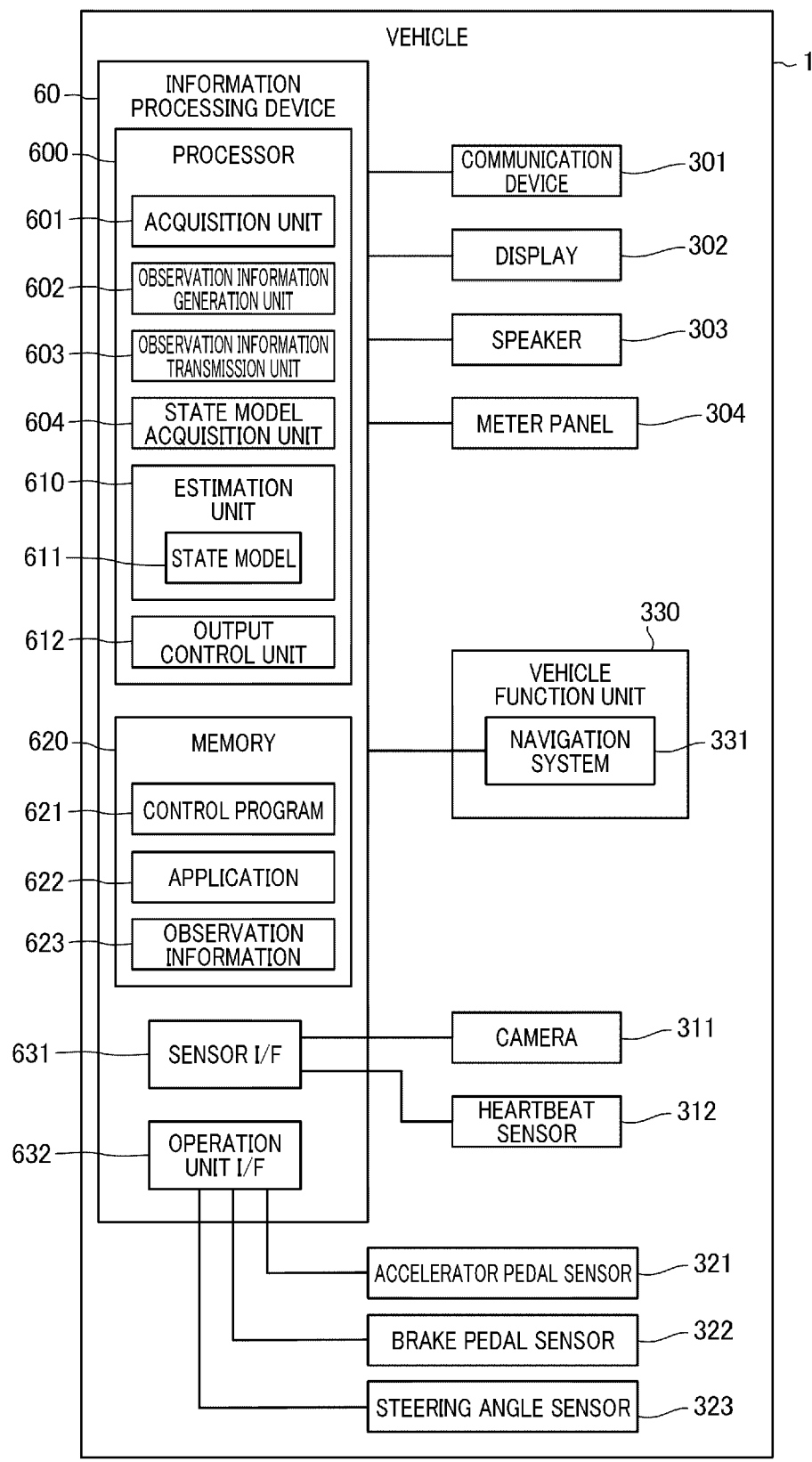
FIG. 15 is a block diagram showing an example of a configuration of an information processing device according to the second embodiment.

FIG. 15 is a block diagram showing an example of a configuration of the information processing device 60 mounted on the vehicle 1.

The information processing device 60 is a device mounted on the vehicle 1, and is a computer including a processor 600. The information processing device 60 may be a device fixed to the vehicle 1, or may be a portable device that is temporarily installed in the vehicle 1. An example of the information processing device 60 to be adopted may include a smartphone, a tablet computer, another type of personal computer, a car navigation device, or a display audio device.

The information processing device 60 is connected with a communication device 301, a display 302, a speaker 303, and a meter panel 304 which are mounted on the vehicle 1. These devices may be built in the information processing device 60.

The configurations of the communication device 301, the display 302, the speaker 303, and the meter panel 304 are common to those of the first embodiment. Further, the configurations of the camera 311 and the heartbeat sensor 312 are also common to those of the first embodiment. The communication device 301 is connected to the communication network NW under control of the processor 600, and executes data communication with the server 7 through the communication network NW. The display 302 has a display screen configured by a liquid crystal display panel or an organic EL panel, and displays characters or images on the display screen based on a display signal or digital display data output by the information processing device 60. The speaker 303 outputs sound based on an sound signal or digital sound data output by the information processing device 60.

The information processing device 60 is connected with the camera 311 and the heartbeat sensor 312.

The camera 311 captures an image capturing range including a face of the user U1, and outputs captured image data to the information processing device 60. The captured image data of the camera 311 is used for at least one of observation of a pupil diameter of the user U1 and detection of breathing of the user U1, as will be described below. In addition, the processor 600 may calculate a heartbeat interval based on a heartbeat detected by the heartbeat sensor 312.

Each of the camera 311 and the heartbeat sensor 312 can be called an observation unit configured to observe the body of the user U1, and using the observation unit, the information processing device 60 may not only observe the pupil diameter, the breathing interval, and the heartbeat interval of the user U1, but also measure other biological information.

The information processing device 60 includes a sensor I/F (interface) 631. The sensor I/F 631 is a connection unit that is connected to the camera 311 and the heartbeat sensor 312 in a wired manner, and includes a connector for connecting a cable and an interface circuit. The sensor I/F 631 acquires the captured image data output by the camera 311 and measurement data of the heartbeat interval output by the heartbeat sensor 312.

The information processing device 60 includes an operation unit I/F 632. The operation unit I/F 632 is connected with at least one of an accelerator pedal sensor 321, a brake pedal sensor 322, and a steering angle sensor 323 provided in the vehicle 1. The accelerator pedal sensor 321 detects the amount of stepping of an accelerator pedal, which is an operation unit for starting up and accelerating the vehicle 1, or a throttle opening corresponding to the operation of the accelerator pedal. The brake pedal sensor 322 detects the amount of stepping of the brake pedal, which is an operation unit for decelerating and stopping the vehicle 1. The steering angle sensor 323 detects the amount of operation of the steering wheel 351, which is an operation unit, or a steering angle of the vehicle 1 accompanying the operation of the steering wheel 351. Each of the accelerator pedal sensor 321, the brake pedal sensor 322, and the steering angle sensor 323 outputs a detection value to the information processing device 60. The operation unit I/F 632 acquires data on the amount of operation output from each of the accelerator pedal sensor 321, the brake pedal sensor 322, and the steering angle sensor 323. The operation unit I/F 632 is, for example, a communication device connected to a CAN installed in the vehicle 1, and may acquire the amount of operation of each of the operation units via the CAN.

Further, the information processing device 60 is connected with a vehicle function unit 330 mounted on the vehicle 1. In the vehicle 1, the vehicle function unit 330 is a device having a different function from the information processing device 60. The vehicle function unit 330 is a device that executes a function separately from the information processing device 60 and outputs sound based on the function of the vehicle function unit 330. For example, the vehicle function unit 330 may be installed on the dashboard 350, or may be housed in a housing integrated with the information processing device 60. A specific configuration of the vehicle function unit 330 can be changed as appropriate depending on specifications of the vehicle 1. In the present embodiment, a navigation system 331 is exemplified as the vehicle function unit 330.

The navigation system 331 is, for example, hardware including a processor different from the processor 600, and includes, for example, an ECU installed in the vehicle 1 separately from the information processing device 60.

The information processing device 60 includes the processor 600 and the memory 620. The processor 600 is a computer configured with a CPU, an MPU, or other integrated circuits. The memory 620 is a storage device that stores programs or data. The processor 600 may use a volatile RAM as a work area. The RAM may be integrated and implemented into the processor 600, or the memory 120 may include the RAM.

The memory 620 is a rewritable nonvolatile storage device, and stores programs executed by the processor 600 and data processed by the processor 600. The memory 620 is configured by, for example, a semiconductor storage device such as a flash ROM or an SSD, or a magnetic storage device. The memory 620 stores a control program 621, an application 622, and observation information 623.

The control program 621 and the application 622 are programs executed by the processor 600, and are stored in the memory 620 so as to be readable by the processor 600. The control program 621 is a basic control program for the processor 600 to control each unit of the information processing device 60, and is an OS. The application 622 is an application program executed on the OS.

The processor 600 includes, as function units, an acquisition unit 601, an observation information generation unit 602, an observation information transmission unit 603, a state model acquisition unit 604, an estimation unit 610, and an output control unit 612. These function units are realized when the processor 600 executes the application 622. The application 622 is an example of a program. The information processing device 60 corresponds to an example of the state estimation device with respect to functions related to the state model acquisition unit 604, the estimation unit 610, and the output control unit 612.

The acquisition unit 601 acquires a state variable including an observation value obtained by observing the user U1 while the user U1 is driving the vehicle 1. The state variable includes at least an observation value. Specifically, the observation value includes at least one of the heartbeat interval, the breathing interval, and the pupil diameter of the user U1. The breathing interval is an interval between breaths of the user U1, and is a time value in units of seconds or milliseconds, for example. For example, the acquisition unit 601 executes at least one of calculation of the pupil diameter of the user U1 and detection of the breathing of the user U1, from the captured image data of the camera 311 acquired by the sensor I/F 631. When the breathing of the user U1 is detected, the acquisition unit 601 calculates the breathing interval. Further, for example, the acquisition unit 601 acquires the heartbeat interval, which is the measurement value of the heartbeat sensor 312, as an observation value. At least one of these pupil diameter, breathing interval, and heartbeat interval is included in the state variable. In addition, the state variable may include the amount of operation of the operation unit in the vehicle 1. For example, the acquisition unit 601 may acquire the amount of operation using the operation unit I/F 632, and acquire and generate a state variable including the observation value and the amount of operation.

The observation information generation unit 602 generates, based on the state variable acquired by the acquisition unit 601, observation information of the user U1. The observation information is information including the state variable, and includes information that specifies the vehicle 1 acquiring the state variable, the information processing device 60, or the user U1 who is a target of acquisition of the state variable. The observation information generation unit 602 repeatedly executes a process of generating the state variable at a preset period. The observation information transmission unit 603 transmits the observation information, which is generated by the observation information generation unit 602, to the server 7 using the communication device 301.

The state model acquisition unit 604 acquires a state model 611 from the server 7, as will be described below. The state model 611 is a model that obtains a cognitive load during driving of the user U1, from the state model acquired by the acquisition unit 601.

The estimation unit 610 includes the state model 611. The state model 611 estimates the state of the user U1 when the state variable acquired by the acquisition unit 601 and the observation information including the state variable is given to the state model 611. The estimation unit 610 estimates the state of the user U1 from the state variable whenever the acquisition unit 601 acquires the state variable or the observation information generation unit 602 generates the observation information, for example.

The state of the user U1 estimated by the estimation unit 610 can be said to be the degree of concentration of the user U1 on driving. In an example to be described below, the estimation unit 610 estimates whether the state of the user U1 is any one of a moderate cognitive load state, a high cognitive load state, and a low cognitive load state.

The inventors have focused on the fact that a person's state of concentration is affected by a person's cognitive load or a cognitive load when a person steers the moving object such as the vehicle 1. The cognitive load refers to a load that is applied to a cognitive function due to person's perception, stimulation received by sense of vision and hearing, or person's movement. The cognitive load state can be said to be the amount of task processing processed by the brain of the user U1. Under the moderate cognitive load state, the amount of task processing is also moderate. On the other hand, the high cognitive load state is a state in which the amount of task processing is large, and the low cognitive load state is a state in which the amount of task processing is small.

When the cognitive load of the user U1 is moderate while the user U1 is driving the vehicle 1, the degree of concentration of the user U1 on the driving is in a moderate state. When the cognitive load of the user U1 while driving is in the high cognitive load state, the user U1 is in a state with an impatient sense, and thus the degree of concentration of the user U1 on the driving decreases. Further, when the cognitive load of the user U1 while driving is in the low cognitive load state, the user U1 is in a distracted state with little stimulation, and thus the degree of concentration of the user U1 on the driving decreases.

Therefore, based on any one of the moderate cognitive load state, the high cognitive load state, and the low cognitive load state as the result of the state of the user U1 estimated by the estimation unit 610, it can be determined whether the degree of concentration of the user U1 on driving is in a moderate state or the degree of concentration is a lower state. The estimation unit 610 can estimate the cognitive load state of the user U1 from the observation information of the user U1, and specify the degree of concentration of the user U1 on driving from the estimated cognitive load state. In other words, it can be said that the estimation unit 610 estimates the degree of concentration of the user U1 on driving.

The output control unit 612 executes an output process based on the result estimated by the estimation unit 610. The output process executed by the output control unit 612 includes a process of causing at least one of the display 302 and the meter panel 304 to display the result estimated by the estimation unit 610. In addition, the output process executed by the output control unit 612 includes a process of adjusting the output to the user U1. Specifically, the output control unit 612 adjusts the volume of the sound output from the speaker 303 and the amount of information displayed on the display 302 or the meter panel 304. For example, when it is estimated that the user U1 is in the high cognitive load state, the output control unit 612 adjusts the output from the display 302, the speaker 303, and the meter panel 304 so as to reduce the cognitive load of the user U1. When it is estimated that the user U1 is in the low cognitive load state, the output control unit 612 adjusts the output from the display 302, the speaker 303, and the meter panel 304 so as to increase the cognitive load of the user U1. A specific example regarding the adjustment of the output will be described below.

[2-3. Configuration of Server]

Figure 16:
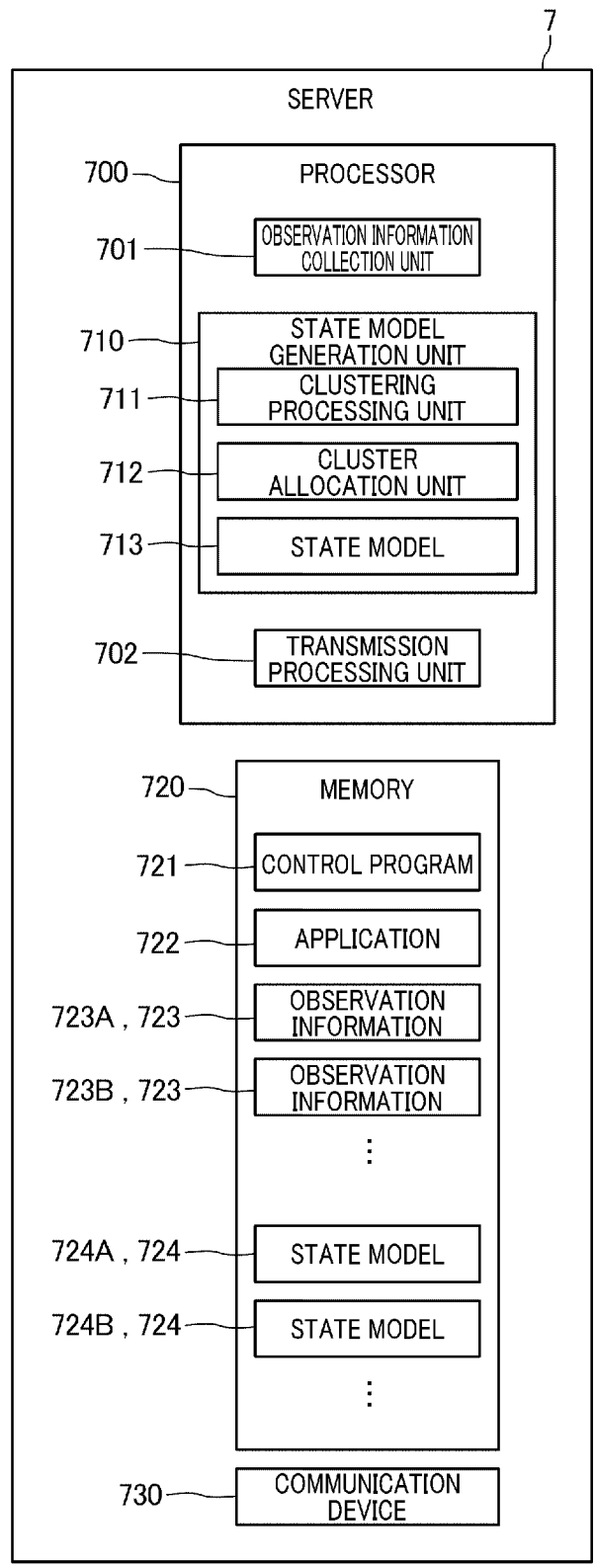
FIG. 16 is a block diagram showing an example of a configuration of a server according to the second embodiment.

FIG. 16 is a block diagram showing an example of a configuration of the server 7.

The server 7 includes a processor 700, a memory 720, and a communication device 730.

The communication device 730 is a wireless communication device including a transmitter that transmits data and a receiver that receives data, and executes cellular communication. The communication device 730 is connected to the communication network NW under control of the processor 700, and executes data communication with the server 7 through the communication network NW.

The server 7 includes the processor 700 and the memory 720. The processor 700 is a computer configured with a CPU, an MPU, or other integrated circuits. The memory 720 is a storage device that stores programs or data. The processor 700 may use a volatile RAM as a work area. The RAM may be integrated and implemented into the processor 700, or the memory 720 may include the RAM.

The memory 720 is a rewritable nonvolatile storage device, and stores programs executed by the processor 700 and data processed by the processor 700. The memory 720 is configured by, for example, a semiconductor storage device such as a flash ROM or an SSD, or a magnetic storage device. The memory 720 stores a control program 721, an application 722, observation information 723, and a state model 724.

The control program 721 and the application 722 are programs executed by the processor 700, and are stored in the memory 720 so as to be readable by the processor 700. The control program 721 is a basic control program for the processor 700 to control each unit of the server 7, and is an OS. The application 722 is an application program executed on the OS.

The processor 700 includes, as function units, an observation information collection unit 701, a transmission processing unit 702, and a state model generation unit 710. These function units are realized when the processor 700 executes the application 722. The application 722 is an example of a program.

The observation information collection unit 701 acquires the observation information from the information processing device 60. The observation information collection unit 701 can obtain state variables including observation values of the plurality of users U1, respectively, by acquiring the observation information from a plurality of the information processing devices 60 included in the information processing system 2000. The observation information collection unit 701 causes the memory 720 to store the observation information, which is acquired from the information processing device 60, as observation information 723. The memory 720 stores the observation information 723 for each user, as will be described below. For example, the memory 720 stores observation information 723A including an observation value obtained by observing a user U1A and observation information 723B including an observation value obtained by observing a user U1B.

The state model generation unit 710 includes a clustering processing unit 711, a cluster allocation unit 712, and a state model 713. The clustering processing unit 711 executes a process of clustering the plurality of pieces of observation information acquired by the observation information collection unit 701 into a plurality of clusters. The cluster allocation unit 712 executes a process of assigning meaning corresponding to the cognitive load during steering of the user U1, to each of the plurality of clusters subjected to the clustering by the clustering processing unit 711.

The clustering processing unit 711 classifies the plurality of pieces of observation information into a prespecified number of clusters using k-means clustering, a hierarchical clustering method, or other known cluster analysis techniques. In the present embodiment, the observation information is classified into three clusters. The cluster allocation unit 712 associates the high cognitive load state, the low cognitive load state, and the moderate cognitive load state of the user U1 with the three clusters, respectively. The state model 713 is generated by the processing of the clustering processing unit 711 and the cluster allocation unit 712. When the observation information is acquired, the state model 713 classifies the acquired observation information into any one of the three clusters, and obtains a cognitive load state obtained by giving meaning to the classified cluster. In other words, the state model 713 can estimate the cognitive load state of the user U1 from the observation information.

The state model 713 is a model for obtaining the cognitive load of the user U1 from the observation information, and is a learning model that has undergone machine learning, a program, a function, or a parameter that determines the cognitive load of the user U1 from the observation value included in the observation information. The state model generation unit 710 generates the state model 713 that reflects processing results of the clustering processing unit 711 and the cluster allocation unit 712. The state model generation unit 710 generates a state model 724 for transmitting the state model 713 to the information processing device 60, and causes the memory 720 to store the state model 724. The state model 713 is generated corresponding to each of the plurality of users U1 who use the information processing system 2000, as will be described below. For example, the state model 724A stored in the memory 720 corresponds to the user U1A, and the state model 724B corresponds to the user U1B. The server 7 may generate state models 724 corresponding to a larger number of users U1, and the memory 720 can store the state model 724 other than the state models 724A and 724B.

The transmission processing unit 702 transmits the state model 724, which is generated by the state model generation unit 710, to the information processing device 60 using the communication device 730. The transmission processing unit 702 corresponds to an example of a transmission processing unit.

[2-4. Operation of Information Processing System]
[2-4-1. Overall Operation]

Figure 17:
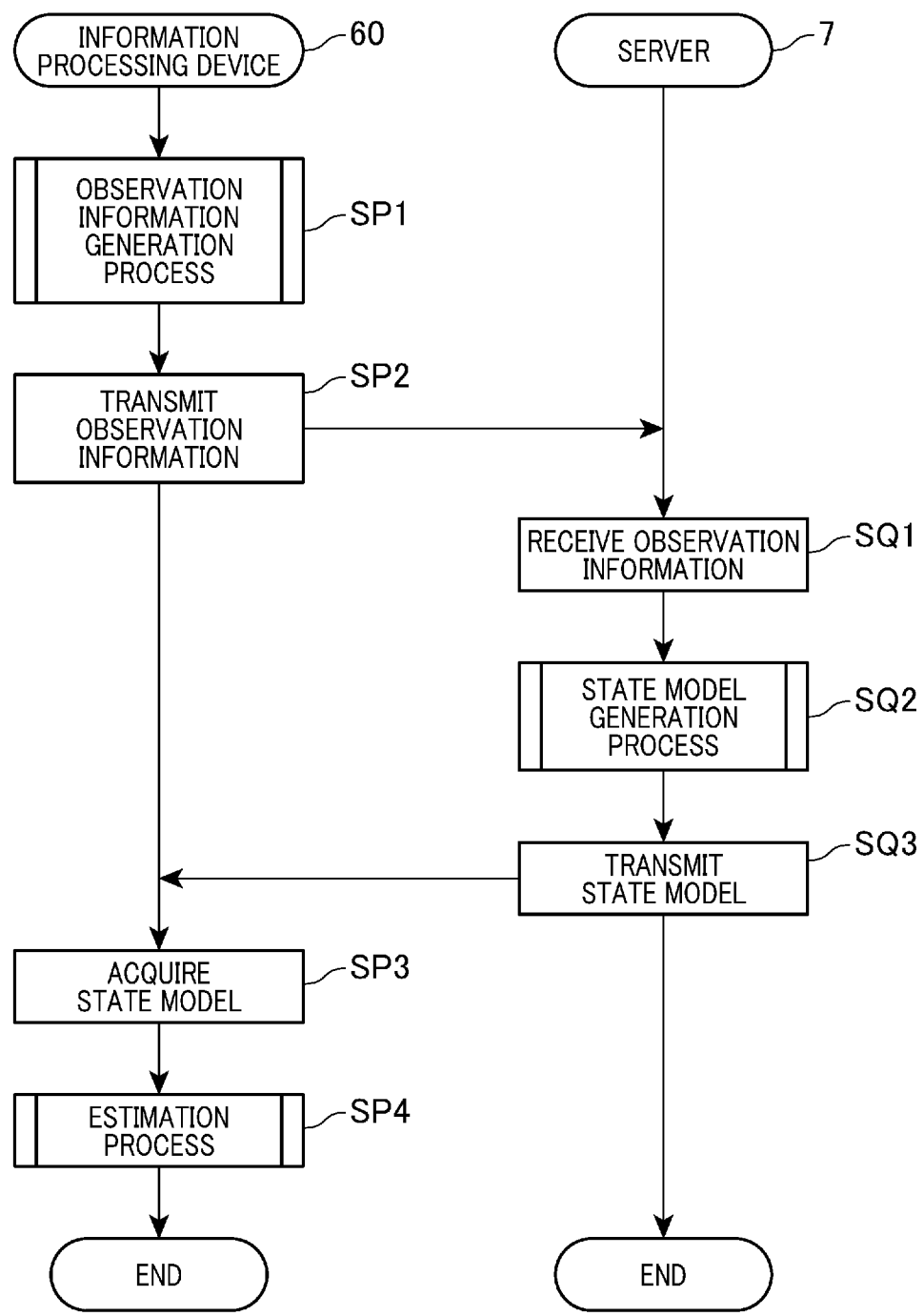
FIG. 17 is a sequence diagram showing an example of an operation of the information processing system according to the second embodiment.

FIG. 17 is a sequence diagram showing an example of an operation of the information processing system 2000.

Steps SP1 to SP4 are operations of the information processing device 60, and steps SQ1 to SQ3 are operations of the server 7.

The information processing device 60 executes an observation information generation process using the acquisition unit 601 and the observation information generation unit 602 (step SP1). The information processing device 60 transmits observation information generated by the observation information generation process to the server 7 using the observation information transmission unit 603 (step SP2). The plurality of information processing devices 60 may execute the operations of steps SP1 and SP2 in parallel. For example, the information processing device 60 mounted on the vehicle 1A and the information processing device 60 mounted on the vehicle 1B can execute steps SP1 and SP2, respectively.

The server 7 uses the observation information collection unit 701 to receive the observation information transmitted by the information processing device 60 (step SQ1), and uses the state model generation unit 710 to execute a state model generation process (step SQ2). Here, the server 7 may wait while repeating the operation of step SQ1 until receiving a sufficient number of pieces of observation information to execute the state model generation process.

The server 7 transmits the state model 724, which is generated by the state model generation unit 710, to the information processing device 60 using the transmission processing unit 702 (step SQ3).

The information processing device 60 uses the state model acquisition unit 604 to acquire the state model transmitted by the server 7 (step SP3). The information processing device 60 loads the acquired state model 611 into the estimation unit 610, and executes an estimation process using the estimation unit 610 (step SP4).

Each of the information processing device 60 mounted on the vehicle 1A and the information processing device 60 mounted on the vehicle 1B executes steps SP1 to SP4 in FIG. 17. In this case, the server 7 executes step SQ1 to SQ3 in response to each of the information processing devices 60.

As described above, the server 7 includes the state model 724 corresponding to each of the users U1. For example, the server 7 includes a state model 724A corresponding to the user U1A and a state model 724B corresponding to the user U1B. The server 7 may perform a process of selecting the state model 724 to be transmitted to the information processing device 60 in step SQ3. For example, the server 7 may perform a process of determining the user U1, who uses the information processing device 60 of a transmitting destination, before transmitting the state model 724. Specifically, the server 7 requests the information processing device 60 to transmit identification information of the user U1 who is the user, and selects the state model 724 based on the information transmitted by the information processing device 60 in response to the request. Further, the information processing device 60 may perform a process of requesting the server 7 to designate the state model 724 prior to step SP3. In this case, the information processing device 60 transmits the identification information of the user U1 to the server 7, and requests the state model 724 corresponding to the identification information.

Hereinafter, the observation information generation process (step SP1), the state model generation process (step SQ2), and the estimation process (step SP4) will be described in detail.

[2-4-2. Generation of Observation Information]

Figure 18:
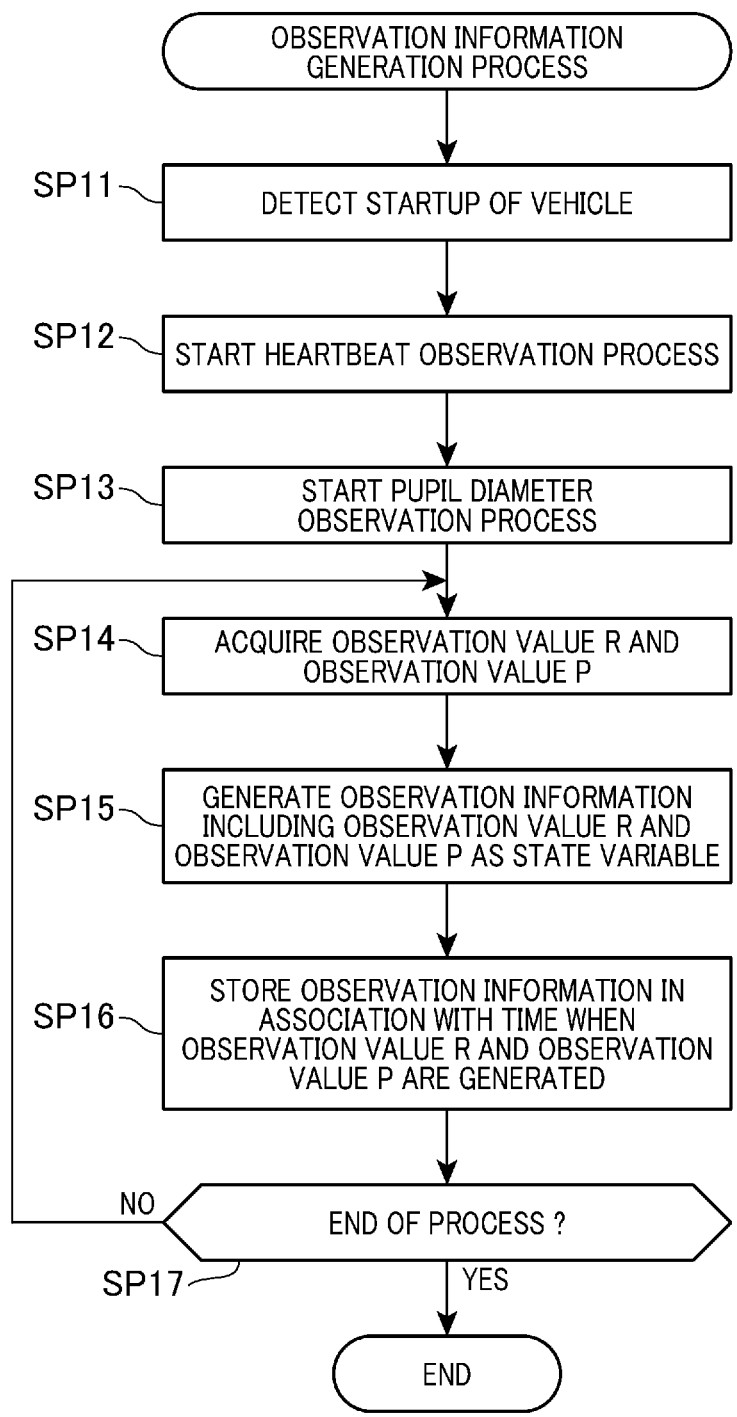
FIG. 18 is a flowchart showing an example of an operation of the information processing device according to the second embodiment.

FIG. 18 is a flowchart showing an example of an operation of the information processing device 60, and shows details of the observation information generation process. In FIG. 18, steps SP11 to SP14 are executed by the acquisition unit 601, and steps SP15 to SP17 are executed by the observation information generation unit 602.

Upon detecting a startup of the vehicle 1 (step SP11), the information processing device 60 starts a heartbeat observation process (step SP12), and starts a pupil diameter observation process (step SP13). Steps SP12 and SP13 may be performed in a reverse order or at the same time. The startup of the vehicle 1 indicates that a control system of the vehicle 1 starts to operate from a stop state, for example, that an ignition switch of the vehicle 1 is turned on or a system power of the vehicle 1 is turned on.

Figure 19:
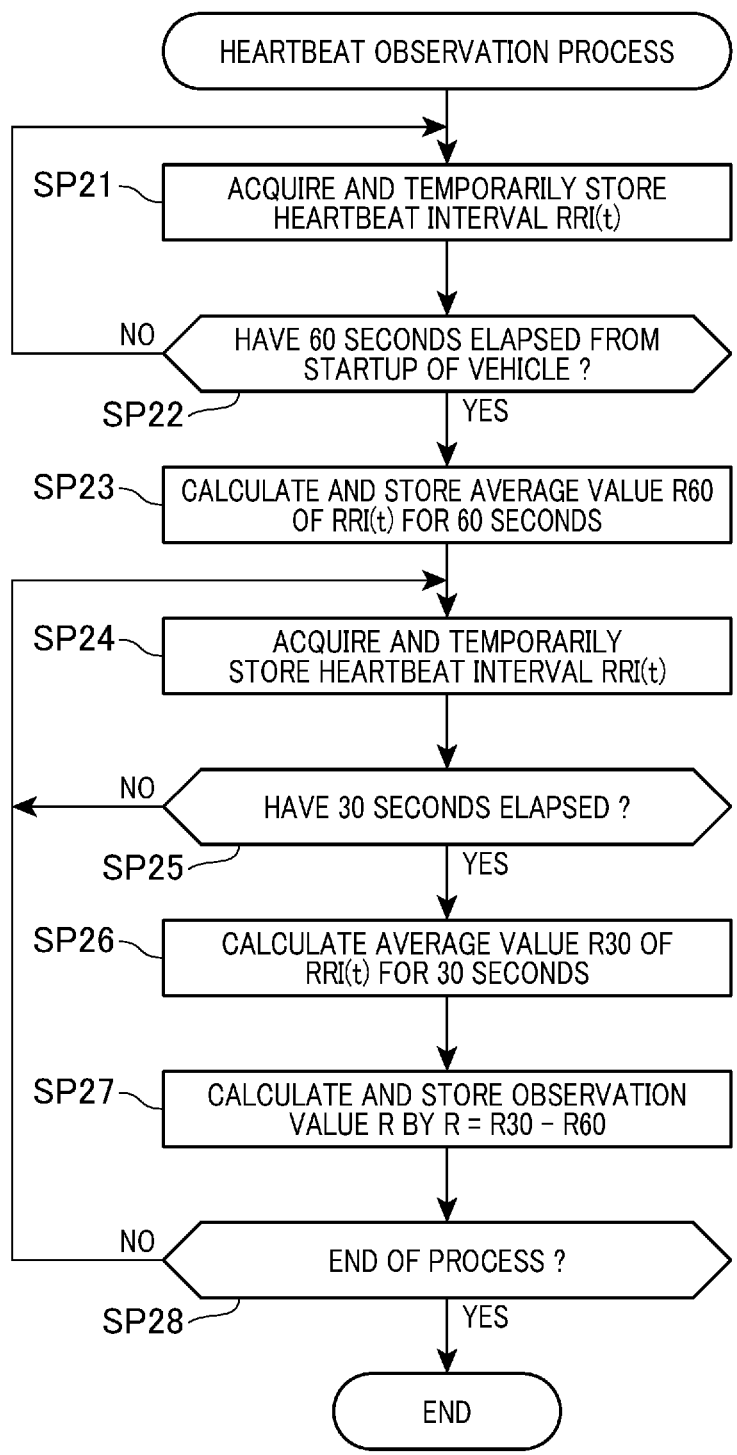
FIG. 19 is a flowchart showing an example of the operation of the information processing device according to the second embodiment.

FIG. 19 is a flowchart showing an example of the operation of the information processing device 60, and shows the heartbeat observation process. Steps SP21 to SP28 are executed by the acquisition unit 601.

As described above, the heartbeat sensor 312 detects the heartbeat of the user U1 at a preset measurement period, calculates the heartbeat interval whenever the heartbeat is detected, and outputs the heartbeat interval as a measurement result. The heartbeat sensor 312 may calculate an average value of the heartbeat intervals over the preset predetermined time, and output the average value of the heartbeat intervals as a measurement value. The information processing device 60 acquires the measurement value of the heartbeat sensor 312 after detecting the startup of the vehicle 1, and temporarily stores the acquired measurement value in the memory 620 as a heartbeat interval RRI(t) (step SP21). The heartbeat interval RRI(t) is data in which the measurement value of the heartbeat sensor 312 is associated with time. Such a time is a measurement time at which the heartbeat sensor 312 performs measurement or a time when the information processing device 60 acquires the measurement value, and can be called an observation time. The information processing device 60 determines whether 60 seconds have elapsed from the startup of the vehicle 1 (YES in step SP22), and the process returns to step SP21 when 60 seconds have not elapsed (NO in step SP22). When 60 seconds have elapsed from the startup of the vehicle 1 (step SP22), the information processing device 60 makes a transition to step SP23. In step SP23, the information processing device 60 calculates a value R60, which is the average value of the heartbeat interval RRI(t) for 60 seconds from the startup of the vehicle 1 (step SP23).

Subsequently, similarly to step SP21, the information processing device 60 acquires the measurement value of the heartbeat sensor 312, and temporarily stores the acquired measurement value in the memory 620 as the heartbeat interval RRI(t) (step SP24). The operation of step SP24 may be started immediately after step SP22. The information processing device 60 determines whether 30 seconds have elapsed from the start of acquiring the heartbeat interval RRI(t) (step SP25), and the process returns to step SP24 when 30 seconds have not elapsed (NO in step SP25). When 30 seconds have elapsed from the start of acquiring the heartbeat interval RRI(t) (YES in step SP25), the information processing device 60 makes a transition to step SP26.

In step SP26, the information processing device 60 calculates a value R30, which is an average value of the heartbeat intervals RRI(t) for 30 seconds temporarily stored in the memory 620 (step SP26). The information processing device 60 calculates a difference by subtracting the value R60 from the value R30, and stores the calculated value in the memory 620 as an observation value R (step SP27).

As described above, in steps SP21 to SP23, the average value R60 of the heartbeat intervals of the user U1 is calculated for 60 seconds at the first time after the startup of the vehicle 1. In steps SP24 to SP26, the average value R30 of the heartbeat intervals of the user U1 is calculated every 30 seconds after 60 seconds have elapsed from the startup of the vehicle 1. Then, the information processing device 60 calculates the difference between the value R30 and the value R60 whenever calculating the average value R30, and sets the calculated difference as the observation value R. Therefore, the observation value R is calculated every 30 seconds after 90 seconds have elapsed from the startup of the vehicle 1, and the calculated observation values R are sequentially accumulated in the memory 620.

The information processing device 60 determines whether to end the heartbeat observation process (step SP28). When conditions for ending the heartbeat observation process are satisfied, for example, when the control system of the vehicle 1 stops or when the user U1 performs an operation related to the end of the heartbeat observation process (YES in step SP28), the information processing device 60 ends the process of FIG. 20. When the information processing device 60 does not end the process (NO in step SP28), the process returns to step SP24.

Figure 20:
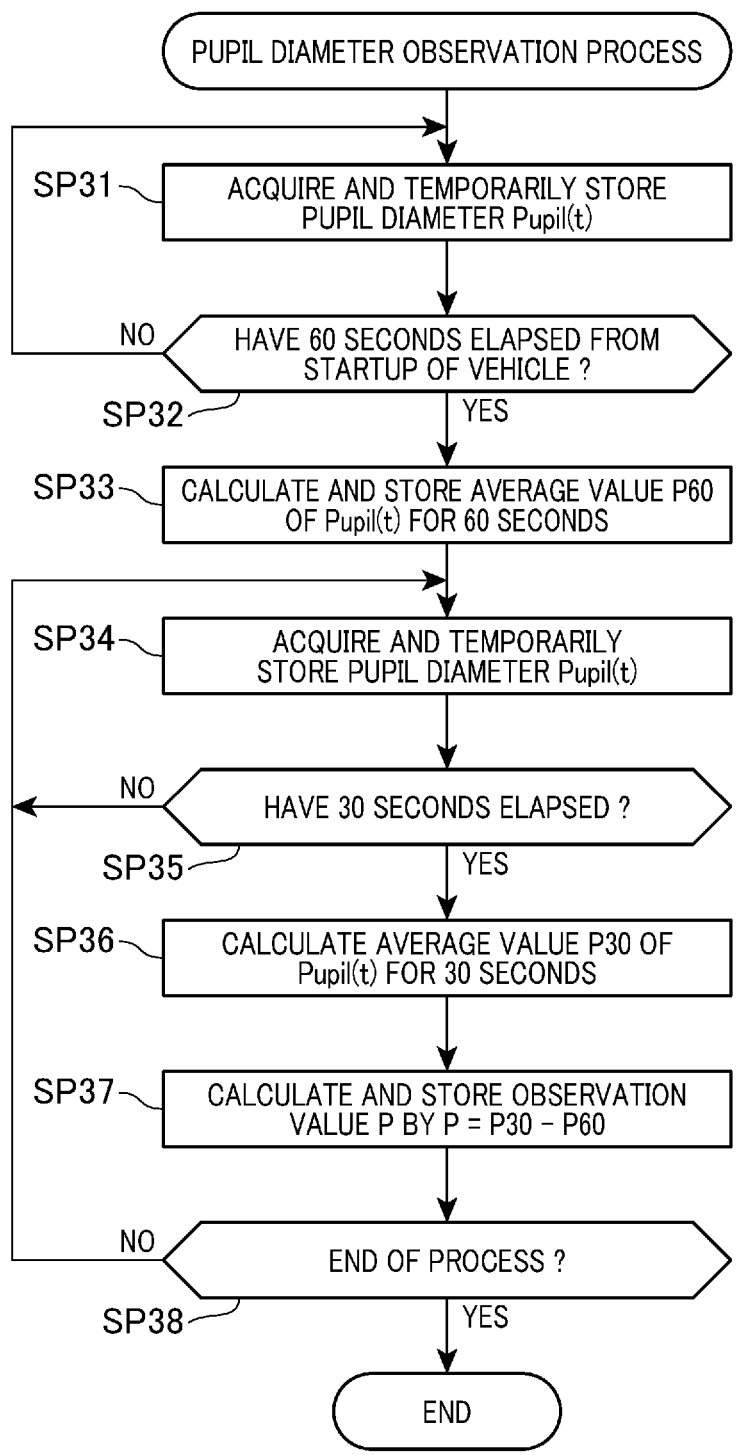
FIG. 20 is a flowchart showing an example of the operation of the information processing device according to the second embodiment.

FIG. 20 is a flowchart showing an example of the operation of the information processing device 60, and shows the pupil diameter observation process. Steps SP31 to SP38 are executed by the acquisition unit 601.

The acquisition unit 601 measures the pupil diameter of the user U1 by analyzing the captured image data of the camera 311. For example, the acquisition unit 601 extracts images of eyes of the user U1 from the captured image data of the camera 311, and calculates the pupil diameter by comparing the outline of the eye and the size of the pupil in the extracted image. The acquisition unit 601 measures the pupil diameter at a preset measurement period, and outputs a measurement result of the pupil diameter every measurement.

The information processing device 60 acquires the measurement value of the pupil diameter after detecting the startup of the vehicle 1, and temporarily stores the acquired measurement value in the memory 620 as a pupil diameter Pupil(t) (step SP31). The pupil diameter Pupil(t) is data in which the measurement value of the pupil diameter is associated with time. Such a time is a measurement time at which the pupil diameter is measured or a time when the information processing device 60 acquires the measurement value, and can be called an observation time. The information processing device 60 determines whether 60 seconds have elapsed from the startup of the vehicle 1 (YES in step SP32), and the process returns to step SP31 when 60 seconds have not elapsed (NO in step SP32). When 60 seconds have elapsed from the startup of the vehicle 1 (step SP32), the information processing device 60 makes a transition to step SP33. In step SP33, the information processing device 60 calculates a value P60, which is the average value of the pupil diameter Pupil(t) for 60 seconds from the startup of the vehicle 1 (step SP33).

Subsequently, similarly to step SP31, the information processing device 60 acquires the measurement value of the pupil diameter, and temporarily stores the acquired measurement value in the memory 620 as the pupil diameter Pupil(t) (step SP34). The operation of step SP34 may be started immediately after step SP32. The information processing device 60 determines whether 30 seconds have elapsed from the start of acquiring the pupil diameter Pupil(t) (step SP35), and the process returns to step SP34 when 30 seconds have not elapsed (NO in step SP35). When 30 seconds have elapsed from the start of acquiring the pupil diameter Pupil(t) (YES in step SP35), the information processing device 60 makes a transition to step SP36.

In step SP36, the information processing device 60 calculates a value P30, which is an average value of the pupil diameter Pupil(t) for 30 seconds temporarily stored in the memory 620 (step SP36). The information processing device 60 calculates a difference by subtracting the value P60 from the value P30, and stores the calculated value in the memory 620 as an observation value P (step SP37).

As described above, in steps SP31 to SP33, the average value P60 of the pupil diameters of the user U1 is calculated for 60 seconds at the first time after the startup of the vehicle 1. In steps SP34 to SP36, the average value P30 of the pupil diameters of the user U1 is calculated every 30 seconds after 60 seconds have elapsed from the startup of the vehicle 1. Then, the information processing device 60 calculates the difference between the value P30 and the value P60 whenever calculating the average value P30, and sets the calculated difference as the observation value P. Therefore, the observation value P is calculated every 30 seconds after 90 seconds have elapsed from the startup of the vehicle 1, and the calculated observation values P are sequentially accumulated in the memory 620.

The information processing device 60 determines whether to end the pupil diameter observation process (step SP38). When conditions for ending the pupil diameter observation process are satisfied, for example, when the control system of the vehicle 1 stops or when the user U1 performs an operation related to the end of the pupil diameter observation process (YES in step SP38), the information processing device 60 ends the process of FIG. 20. When the information processing device 60 does not end the process (NO in step SP38), the process returns to step SP34.

In FIG. 18, the information processing device 60 acquires the observation value R and the observation value P (step SP14). In step SP14, the information processing device 60 acquires the observation value R and the observation value P stored in the memory 620, and thus step SP14 can be executed even when either the heartbeat observation process (FIG. 19) or the pupil diameter observation process (FIG. 20) is being executed. The information processing device 60 mounted on the vehicle 1A acquires the observation value R and the observation value P of the user U1A in step SP14. Further, the information processing device 60 mounted on the vehicle 1B acquires the observation value R and the observation value P of the user U1B in step SP14.

The information processing device 60 generates observation information including, as state variables, the observation value R and the observation value P acquired in step SP14 (step SP15). In the present embodiment, the state variable includes the two observation values R and P, but the state variable may include three or more observation values. The information processing device 60 stores the generated observation information in the memory 620 in association with the time when either or both of the observation value R and the observation value P is generated (step SP16). In step SP16, the information processing device 60 may store the observation information in association with the time when the observation information is generated. The information processing device 60 determines whether to end the observation information generation process (step SP17). When conditions for ending the observation information generation process are satisfied, for example, when the control system of the vehicle 1 stops (YES in step SP17), the information processing device 60 ends the process of FIG. 18. When the information processing device 60 does not end the process (NO in step SP17), the process returns to step SP14.

By the operations shown in FIGS. 18, 19, and 20, for example, the observation information of the user U1A is generated in the vehicle 1A, and the observation information of the user U1B is generated in the vehicle 1B. Such operations are executed by the information processing device 60 in the vehicles 1A and 1B, and thus the observation information is generated for the plurality of users U1A and U1B. The generated observation information is stored in the memory 620 of each of the information processing devices 60 in association with each of the users U1 and the time. Therefore, a plurality of pieces of observation information at different times are generated for one user U1 and accumulated in the memory 620.

[2-4-3. Generation of State Model]

Figure 21:
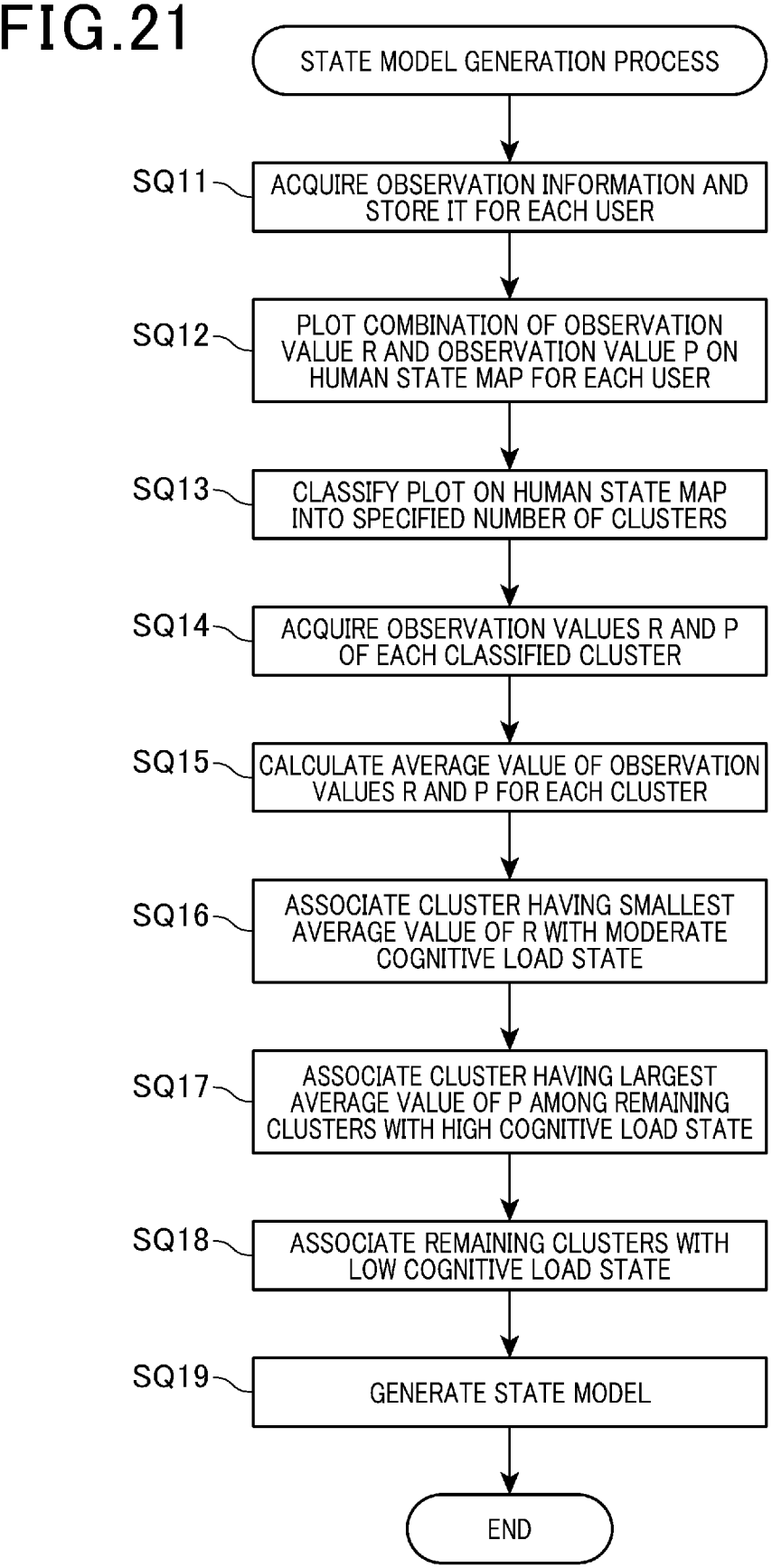
FIG. 21 is a flowchart showing an example of an operation of the server according to the second embodiment.
Figure 22:
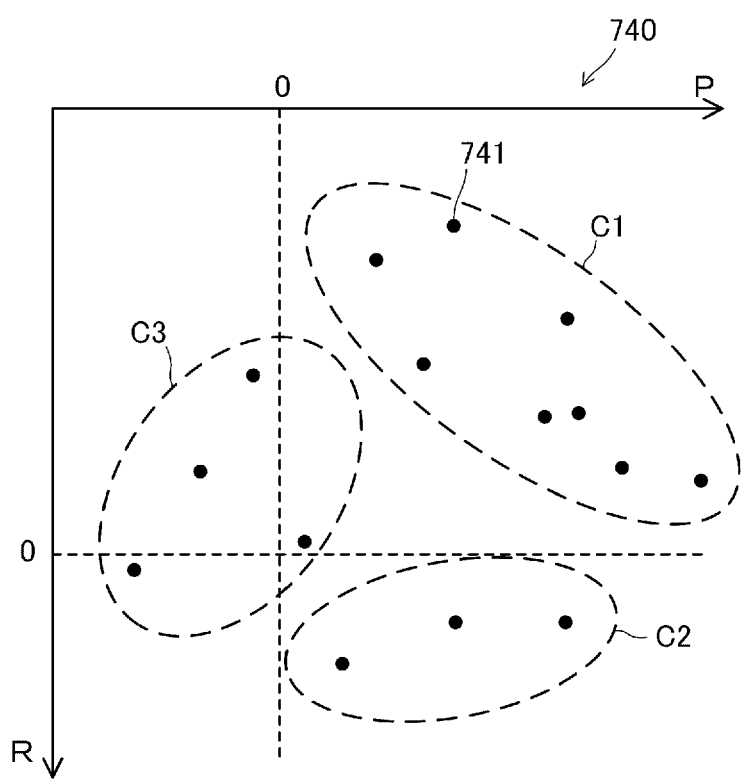
FIG. 22 is a schematic diagram showing an example of a human state map according to the second embodiment.

FIG. 21 is a flowchart showing an example of an operation of the server 7, and shows details of the state model generation process. In FIG. 21, step SQ11 is executed by the observation information collection unit 701, steps SQ12 and SQ13 are executed by the clustering processing unit 711, and steps SQ13 to SQ19 are executed by the cluster allocation unit 712. FIG. 22 is a schematic diagram showing an example of a human state map 740 in the state model generation process.

The server 7 acquires observation information from the information processing device 60 mounted on the vehicle 1, and stores it in the memory 720 for each user (step SQ11). For example, the server 7 stores the observation information of the user U1A as observation information 723A, and stores the observation information of the user U1B as observation information 723B.

As shown in FIG. 14, when it is determined that the user U1A steers the vehicle 1A and the user U1B steers the vehicle 1B, the observation information collection unit 701 stores the observation information acquired from the information processing device 60 of the vehicle 1A as the observation information 723A. Further, the observation information collection unit 701 stores the observation information acquired from the information processing device 60 of the vehicle 1B as the observation information 723B.

In the information processing system 2000, the information processing device 60 may be configured to identify the user U1. For example, when the startup of the vehicle 1 is detected in step SP11, the acquisition unit 601 identifies the user U1 who steers the vehicle 1. Specifically, there may be a case where the user U1 inputs identification information such as a user name or a user ID to the information processing device 60, and a case where the acquisition unit 601 identifies the face of the user U1 using the image captured by the camera 311. In this case, the information processing device 60 transmits the observation information to the server 7 such that the server 7 can identify which user U1 the observation information belongs to. For example, the information processing device 60 generates observation information including the identification information of the user U1 in the observation information generation process (see FIG. 18) (step SP15). In this case, since the observation information includes the identification information of the user U1, the server 7 determines the user U1 corresponding to the observation information by referring to the observation information. For example, when transmitting the observation information to the server 7 (step SP2), the information processing device 60 may add the identification information of the user U1 to the observation information. In this case, the server 7 determines the user U1 corresponding to the observation information by referring to the identification information added to the observation information transmitted by the information processing device 60.

Thus, in step SQ11, the server 7 determines the user U1 corresponding to the observation information received from the information processing device 60, and causes the memory 620 to store the observation information in association with the determined user U1. The server 7 can repeatedly acquire observation information about one user U1 from the information processing device 60. As described above, the information processing device 60 periodically generates the observation value R and the observation value P, and generates the observation information. The information processing device 60 transmits the observation information to the server 7 whenever the observation information is generated or whenever a predetermined number of pieces of the observation information is generated. When the observation information is received, the server 7 performs a process of determining observation information 623 corresponding to the same user U1 in the received observation information, and updating the determined observation information 623 by adding the received observation information. Thereby, a plurality of pieces of observation information are accumulated in the memory 620 for each user. Each of the observation information 623 may include observation information observed in different vehicles 1. For example, the observation information of the user U1A may include observation information obtained by observing the user U1A in the vehicle 1A and observation information obtained by observing the user U1A in the vehicle 1B.

The server 7 extracts an observation value R and an observation value P from the acquired observation information, and plots the observation value R and the observation value P on the human state map 740 (step SQ12). In step SQ12, when the observation information 623 stored in the memory 620 includes a plurality of pieces of observation information, the server 7 plots a combination of the observation value R and the observation value P included in the plurality of pieces of observation information on the human state map 740. The human state map 740 is a map schematically showing the operation of the clustering processing unit 711, and data corresponding to the human state map 740 is actually stored in the memory 720. The server 7 generates a human state map 740 for each user. Specifically, the server 7 has a human state map 740 corresponding to the user U1A and a human state map 740 corresponding to the user U1B.

For example, the observation information of the user U1A is plotted on the human state map 740 corresponding to the user U1A.

The human state map 740 is a two-dimensional map corresponding to the fact that the state variable included in the observation information includes two observation values R and P, as shown in FIG. 22 as an example. In the example of FIG. 22, a horizontal axis indicates the observation value P, a vertical axis indicates the observation value R, and one piece of observation information is arranged as one plot 741. For example, when the observation information 623 retained by the server 7 includes 10 pieces of observation information of the user U1A, the 10 pieces of observation information is plotted on the human state map 740.

The server 7 executes a clustering process on the plot 741 on the human state map 740, and classifies the plot 741 into a specified number of clusters (step SQ13). In the present embodiment, the number of clusters is designated as three. As a specific classification method, as described above, the k-means clustering, the hierarchical clustering method, or other known cluster analysis techniques can be used.

The server 7 acquires the observation value R and the observation value P of the observation information included in each cluster classified in step SQ13 (step SQ14). The server 7 calculates, for each cluster, an average value of the observation values R and an average value of the observation values P acquired in step SQ14 (step SQ15).

The server 7 associates the cluster having the smallest average value of the observation values R with a moderate cognitive load state (step SQ16). Thus, a meaning of the cognitive load state is assigned to one cluster.

Subsequently, the server 7 associates the cluster having the largest average value of the observation values P, among the remaining clusters not assigned with meaning, with a high cognitive load state (step SQ17). Further, the server 7 associates the remaining clusters not assigned with meaning with a low cognitive load state (step SQ18). In steps SQ16 to SQ18, meanings of the cognitive load states are assigned to three clusters.

FIG. 22 shows three clusters C1, C2, and C3 classified by the clustering processing unit 711. The cluster C1 is associated with a moderate cognitive load state, the cluster C2 is associated with a low cognitive load state, and the cluster C3 is associated with a high cognitive load state.

The server 7 generates a state model 713 (step SQ19). When new observation information is input to the state model 713, the state model 713 determines whether the input observation information belongs to any one of the clusters C1, C2, and C3, and outputs the cognitive load state, to which the meaning is assigned to the determined cluster, as a determination result. Therefore, the output of the state model 713 is any one of the moderate cognitive load state, the high cognitive load state, and the low cognitive load state.

The state model 713 is, for example, a learned model that has been subjected to machine learning for the correlation between the clusters C1, C2, and C3 and the observation value R and the observation value P included in each of the clusters, and is a so-called artificial intelligence (AI). In this case, the clustering process performed by the clustering processing unit 711 in steps SQ12 and SQ13 corresponds to unsupervised learning, which is a type of machine learning. The process of steps SQ14 to SQ18 corresponds to a process of setting output data of the learned model. Further, the state model 713 may be a program, a function, or a parameter such as a threshold value that determines the cognitive load state from the observation value R and the observation value P.

The server 7 causes the memory 720 to store, as the state model 724, the state model 713 generated in step SQ19 in association with the user corresponding to the human state map 740 used to generate the state model 713. The state model 724 is the state model 713 itself, or a program or data used for the information processing device 60 to generate a model similar to the state model 713. Then, the state model 724 is transmitted to the information processing device 60 in step SQ3 of FIG. 17, and thus the information processing device 60 can execute the estimation process. The state model 724 is stored in the memory 720 in association with each user U1 who uses the information processing system 2000. For example, when the state of the user U1A is estimated in the information processing device 60, the state model 724A corresponding to the user U1A can estimate the state of the user U1A with higher accuracy, which is suitable.

The server 7 executes the state model generation process shown in FIG. 21 at a predetermined timing. For example, the server 7 executes the state model generation process when the number of pieces of the observation information received from the information processing device 60 is equal to or greater than a preset threshold value. In addition, the server 7 executes the state model generation process whenever the set number of pieces of the observation information is received from the information processing device 60 or whenever a set time elapses after the state model 713 is generated. In this case, the server 7 updates the state model 713, which is already generated, and transmits the state model 724 corresponding to the updated state model 713 to the information processing device 60.

[2-4-4. Estimation Process]

Figure 23:
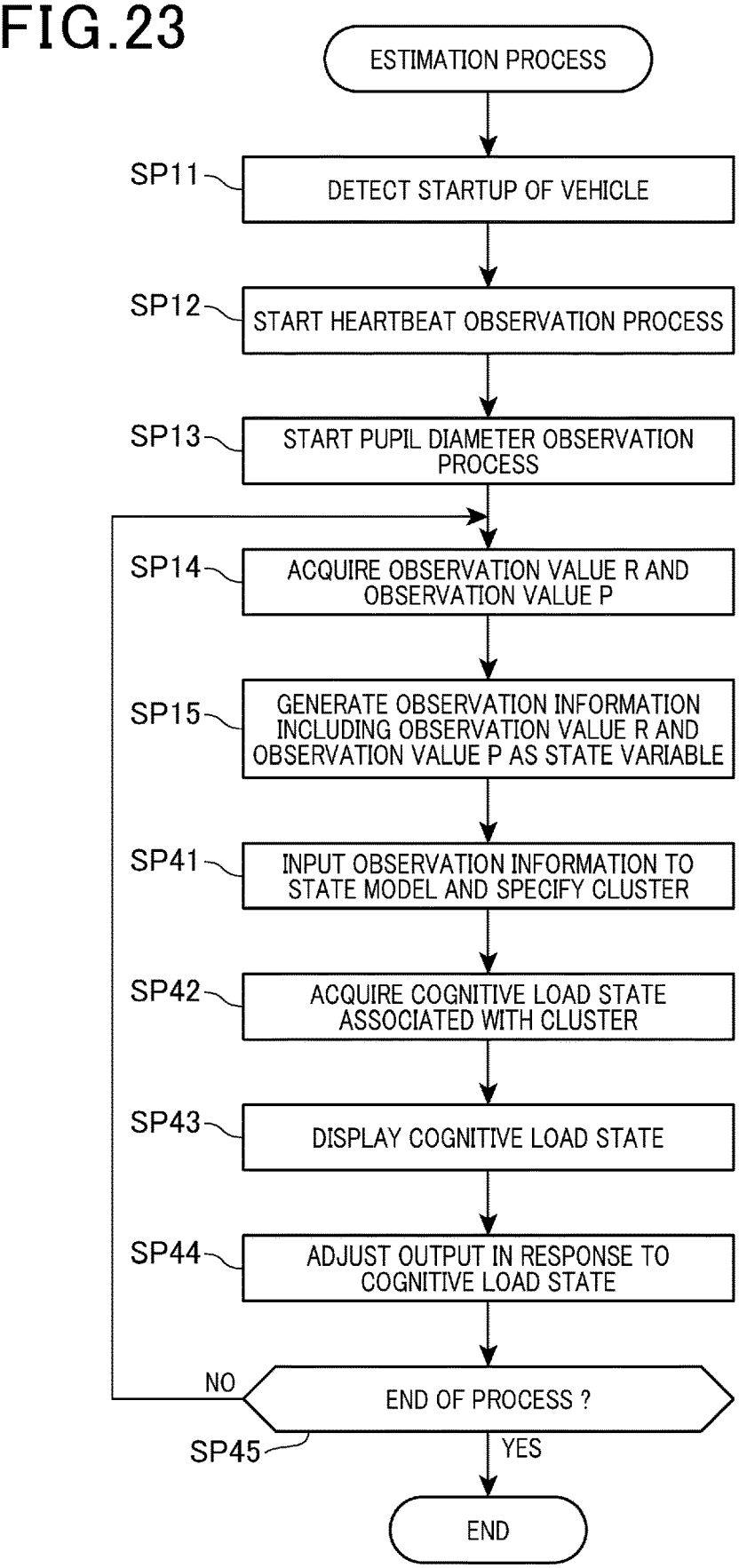
FIG. 23 is a flowchart showing an example of an operation of the state estimation device according to the second embodiment.

FIG. 23 is a flowchart showing an example of an operation of the information processing device 60, and shows details of the estimation process. The information processing device 60 for executing the operation of FIG. 23 corresponds to an example of a control device.

Steps SP11 to SP15 are the same steps as in FIG. 18. Step SP41 is executed by the estimation unit 610, and steps SP42 to SP45 are executed by the output control unit 612.

Upon detecting a startup of the vehicle 1 (step SP11), the information processing device 60 starts a heartbeat observation process (step SP12), and starts a pupil diameter observation process (step SP13). The information processing device 60 acquires an observation value R and an observation value P (step SP14). The information processing device 60 generates observation information including the observation value R and the observation value P, which are acquired in step SP14, as state variables (step SP15).

The information processing device 60 inputs the observation information generated in step SP15 to the state model 611, and thus determines a cluster to which the observation information belongs (step SP41). The state model 611 is formed by the state model 724 received from the server 7 by the information processing device 60, and is a state model corresponding to the user U1 who uses the information processing device 60. The information processing device 60 acquires a cognitive load state associated with the determined cluster (step SP42). Specifically, the information processing device 60 acquires, an estimation result, any one of a moderate cognitive load state, a high cognitive load state, and a low cognitive load state.

The information processing device 60 displays the cognitive load state acquired in step SP42 (step SP43). In step SP43, the degree of concentration of the user U1 determined from the cognitive load state may be displayed. For example, the information processing device 60 displays characters or images indicating the cognitive load state or the degree of concentration on driving of the user U1 on either or both of the display 302 and the meter panel 304.

Figure 24:
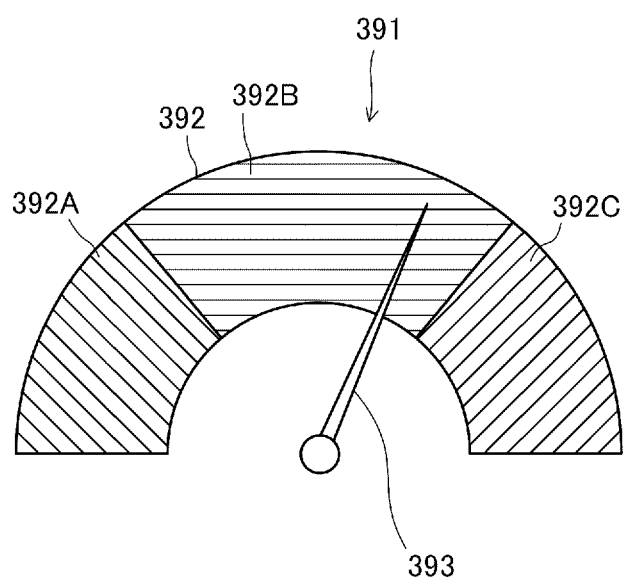
FIG. 24 is a view showing an example of a state display unit according to the second embodiment.

FIG. 24 is a view showing an example of a state display unit 391 displayed on the meter panel 304 by the output control unit 612. The state display unit 391 is displayed on a liquid crystal panel provided on the meter panel 304, for example.

The state display unit 391 includes a needle-shaped indicator 393 and a gauge 392 arranged within a moving range of the indicator 393. The gauge 392 has a circular arc shape, and the indicator 393 rotatably moves along the gauge 392. The gauge 392 and the indicator 393 are images displayed on a liquid crystal panel, for example.

The gauge 392 is divided into three regions 392A, 392B, and 392C, and each of the regions 392A, 392B, and 392C is painted in a different color. The region 392A indicates that the cognitive load state of the user U1 is low, that is, the low cognitive load state. The region 392B indicates that the user U1 is in a moderate cognitive load state, and the region 392C indicates that the user U1 is in a high cognitive load state. Each of the regions 392A, 392B, and 392C may be painted in a different color to remind of a cognitive load state corresponding to each of the regions. Further, each of the regions 392A, 392B, and 392C may be appended with characters indicating the cognitive load state corresponding to each of the regions, or characters indicating the task processing amount corresponding to the cognitive load state of each of the regions.

The output control unit 612 causes the state display unit 391 to display, and thus can display the cognitive load state of the user U1, the task processing amount, or the degree of concentration on driving based on the position of the indicator 393 on the gauge 392.

The information processing device 60 adjusts the output of the information processing device 60 in response to the cognitive load state after step SP43 or in parallel with step SP43 (step SP44). In step SP44, the output is adjusted from the device provided in the vehicle 1 to the user U1. Specifically, the information processing device 60 uses the output control unit 612 to adjust the volume of the sound output from the speaker 303, display luminance of the display 302 or the meter panel 304, and the amount of information to be displayed.

When the user U1 is in the high cognitive load state, the output control unit 612 adjusts the output so as to reduce the cognitive load of the user U1. For example, the output control unit 612 executes a process of reducing the volume of the sound output from the speaker 303, a process of reducing the display luminance (brightness) of the display 302, and a process of reducing the display luminance (brightness) of the meter panel 304. Through these processes, it is possible to reduce intensity of external stimulation applied to the user U1, and it is possible to prevent an increase in the cognitive load of the user U1 or to reduce the cognitive load.

For example, the output control unit 612 reduce the amount of information output to the user U1 by the vehicle 1 in order to reduce the cognitive load of the user U1. Specifically, the output control unit 612 reduces the chances of outputting sound from the speaker 303. When the information processing device 60 performs control to output the sound from the speaker 303 based on data input from the navigation system 331, the output control unit 612 thins out the data used for the output of the sound, thereby reducing the number of times or frequency of sound output from the speaker 303. The output control unit 612 may output an instruction to the navigation system 331 to reduce the number of times or frequency of sound output.

Further, for example, the output control unit 612 reduce the amount of information displayed on the display 302 and the meter panel 304 in order to reduce the cognitive load of the user U1. When the information processing device 60 performs control to cause the display 302 to display the information based on data input from the navigation system 331, the output control unit 612 thins out the data used for the display, thereby reducing the amount of information to be displayed. Further, the output control unit 612 may output an instruction to the navigation system 331 to reduce the amount of information to be displayed. In addition, the output control unit 612 may cause the meter panel 304 to stop a display of low importance regarding the driving of the vehicle 1.

When it is estimated that the user U1 is in the low cognitive load state, the output control unit 612 executes an output process to increase the cognitive load of the user U1. For example, the output control unit 612 executes a process of increasing the volume of the sound output from the speaker 303, a process of increasing the display luminance (brightness) of the display 302, and a process of increasing the display luminance (brightness) of the meter panel 304. Through these processes, it is possible to reduce intensity of external stimulation applied to the user U1, and it is possible to prevent a decrease in the cognitive load of the user U1 or to increase the cognitive load. For example, the output control unit 612 increase the amount of information output to the user U1 by the vehicle 1. Specifically, the output control unit 612 increases the chances of outputting sound from the speaker 303. In this case, the output control unit 612 may output an instruction to the navigation system 331 to increase the number of times or frequency of sound output. Further, the output control unit 612 may increase the amount of information displayed on the display 302 and the meter panel 304. Specifically, the output control unit 612 may output an instruction to the navigation system 331 to increase the amount of information to be displayed. Further, the output control unit 612 may cause the meter panel 304 to display many displays of low importance regarding the driving of the vehicle 1.

When it is estimated that the user U1 is in the moderate cognitive load state, the output control unit 612 executes an output process to prevent fluctuations in the cognitive load of the user U1. For example, the output control unit 612 executes a process of preventing changes in the volume of the sound output from the speaker 303, a process of preventing changes in the display luminance (brightness) of the display 302, and a process of preventing changes in the display luminance (brightness) of the meter panel 304. Specifically, when a process or operation is performed to increase or reduce the volume of the sound output from the speaker 303 beyond a preset range, the output control unit 612 makes the amount of change in the volume smaller than the amount of change corresponding to the process or operation. Through these processes, it is possible to prevent changes in external stimulation applied to the user U1, and it is possible to maintain the cognitive load of the user U1 at the moderate cognitive load state. In this case, the output control unit 612 may prevent, for example, an increase or decrease in chances of outputting sound from the speaker 303, or a change in the amount of information to be displayed on the display 302 or the meter panel 304.

The information processing device 60 determines whether to end the estimation process (step SP45). When conditions for ending the estimation process are satisfied, for example, when the control system of the vehicle 1 stops (YES in step SP45), the information processing device 60 ends the process of FIG. 23. When the information processing device 60 does not end the process (NO in step SP45), the process returns to step SP14.

The information processing device 60 repeatedly executes steps SP14 to SP45, thereby acquiring new observation values R and observation values P every 30 seconds, for example. For this reason, the estimation result of the cognitive load state of the user U1 is updated every 30 seconds, and the display of the cognitive load state (step SP43) and the adjustment of the output (step SP44) are performed based on the updated estimation result.

3. Other Embodiments

The above-described embodiments are merely examples of one aspect of the present invention, and can be arbitrarily modified and applicable.

An example has been described in the above-described embodiments in which the observation value of the pupil diameter and the observation value of the heartbeat interval are used as state information of the user. This is merely an example, and state information including the breathing interval of the user per unit time as an observation information may be used. Further, the observation information may include the amount of operation in addition to the observation value. In such a case, the state model generation unit 510 clusters the observation value and the amount of operation included in the observation information, and determines a specified number of clusters.

An example has been described in the above-described embodiments in which the observation information processed by the state model generation unit 510 or 710 is a two-dimensional data set including two observation values and the clustering process is executed by the two-dimensional human state map 540 or 740. This is merely an example, and data sets with more dimensions may be subjected to the clustering process, for example. In other words, when the total number of observation value and the amount of operation included in the observation information is three or more, the clustering process may be performed on a three-dimensional or more multidimensional data set.

An example has been described in the above-described embodiments in which the navigation system 331 is provided as the vehicle function unit 330 of the vehicle 1 or 2, but the vehicle function unit 330 may be another device that performs display and sound output. Specifically, the vehicle function unit 330 may include an advanced driver-assistance system (ADAS), a music player, and other infotainment system.

Further, the information processing device 10 may not include the state model acquisition unit 104, the estimation unit 110, and the output control unit 112. In other words, the information processing device 10 may be a device that only has the function of generating the observation information and transmitting it to the server 5. In addition, the information processing device 60 may not include the state model acquisition unit 604, the estimation unit 610, and the output control unit 612. In other words, the information processing device 60 may be a device that only has the function of generating the observation information and transmitting it to the server 7.

The configuration is an example in which the server 5 executes the process of generating the state model 513. For example, the information processing device 10 or the state estimation device 20 may have the same configuration as that of the state model generation unit 510 and perform the process of generating the state model. In this case, the information processing device 10 or the state estimation device 20 that has generated the state model may transmit the state model to another information processing device 10 and state estimation device 20. Similarly, the configuration is an example in which the server 7 executes the process of generating the state model 713. For example, the information processing device 60 may have the same configuration as that of the state model generation unit 710 and perform the process of generating the state model. In this case, the information processing device 60 that has generated the state model may transmit the state model to another information processing device 60.

The processor 100, 200, 500, 600, or 700 may be configured by a single processor or may be configured by a plurality of processors. The processor 100, 200, 500, 600, or 700 may be hardware programmed to realize the corresponding functional units. In other words, the processor 100 may be configured by, for example, an application specific integrated circuit (ASIC) or a field programmable gate array (FPGA).

Further, the configurations of each of the components shown in FIGS. 2, 4, 5, 15, and 16 are merely examples, and a specific implementation form is not particularly limited. In other words, hardware individually corresponding to each of the components may not necessarily be implemented, but it is apparently possible to realize functions of each of the components by executing programs by one processor. Further, a part of the functions realized by software in the above-described embodiments may be realized by hardware, or a part of the functions realized by hardware may be realized by software. Additionally, a specific detail configuration of each of the components of the information processing system 1000 or 2000 can be arbitrarily changed.

The operation step units shown in FIGS. 6 to 10, 12, 17 to 21, and 23 are divided depending on main process contents in order to facilitate understanding of the operation, and the present invention is not limited by a division method or a name of the process units. The operation step units may be divided into more step units depending on the process contents. In addition, one step unit may be divided so as to include more processes. The order of the steps may be changed as appropriate without departing from the spirit and scope of the present invention.

Further, in the case of realizing the information processing method of the information processing system 1000 or 2000 described above using the processor 100, 200, 500, 600, or 700, it is also possible to implement the program to be executed by each processor in the form of a non-transitory recording medium or a transmission medium which transmits the program. For example, the application 122, 222, 522, or 622 can be realized in the state of being recorded in a portable information recording medium. Examples of the information recording medium are a magnetic recording medium such as a hard disk, an optical recording medium such as a CD, and a semiconductor storage device such as a universal serial bus (USB) memory and an solid state drive (SSD), and other recording mediums can be also used.

4. Configurations Supported by Embodiments Described Above

The above-described embodiments support the following configurations.

(Configuration 1) An information processing system including: an acquisition unit configured to acquire a state variable including an observation value obtained by observing a steersman who steers an moving object; and an estimation unit including a state model having a correlation between the state variable and a cognitive load during steering of the steersman and configured to estimate a state of the steersman from the state variable acquired by the acquisition unit.

According to the information processing system of Configuration 1, it is possible to estimate the state of the steersman, who steers the moving object, using the state model. For this reason, it is possible to more appropriately determine the state of the steersman, and thus to contribute to the development of a sustainable transportation system.

The information processing system, in which the observation value may include at least one of a heartbeat interval, a breathing interval, and a pupil diameter of the steersman.

According to this configuration, it is possible to estimate the state of the steersman with high accuracy using the observation value regarding the body of the steersman.

(Configuration 2) The information processing system according to Configuration 1, in which the observation value includes a first observation value and a second observation value selected from any of a heartbeat interval, a breathing interval, and a pupil diameter of the steersman, and the estimation unit includes a state model having a correlation among the first observation value, the second observation value, and the cognitive load of the steersman, and estimates a state of the steersman from the first observation value and the second observation value included in the state variable.

According to the information processing system of Configuration 2, it is possible to estimate the state of the steersman with higher accuracy from a plurality of observation values regarding the body of the steersman using the state model.

(Configuration 3) The information processing system according to Configuration 1 or 2, in which the acquisition unit is configured to acquire the state variable at a predetermined period, and the estimation unit is configured to estimate the state of the steersman from the state variable acquired whenever the acquisition unit acquires the state variable.

According to the information processing system of Configuration 3, it is possible to periodically estimate the state of the steersman which changes over time.

In the information processing system, the state of the steersman estimated by the estimation unit may be configured to correspond to the degree of concentration on steering of the steersman.

According to this configuration, it is possible to estimate the degree of concentration on steering of the steersman. For this reason, for example, it is possible to effectively support the steersman by encouraging the steersman to increase the degree of concentration.

In the information processing system, the state variable may include the observation value and the amount of operation of the operation unit provided in the moving object.

According to this configuration, it is possible to estimate the state of the steersman more appropriately by reflecting the operation of the steersman with respect to the operation unit of the moving object.

In the information processing system, an estimation result of the estimation unit may be displayed on a display unit provided in the moving object.

According to this configuration, it is possible to notify the steersman of the result of estimating the state of the steersman of the moving object.

(Configuration 4) The information processing system according to any one of Configurations 1 to 3, in which the state model is generated by execution of a process of clustering observation information generated based on the state variable including the observation value obtained by observing the steersman at a predetermined observation timing into a plurality of clusters and a process of assigning a meaning corresponding to the cognitive load during steering of the steersman to each of the plurality of clusters.

According to the information processing system of Configuration 4, it is possible to estimate the state of the steersman more appropriately with high accuracy using the state model generated by clustering the observation values of the steersman.

(Configuration 5) An information processing method performed by a computer, including: acquiring a state variable including an observation value obtained by observing a steersman who steers an moving object; and estimating a state of the steersman from the acquired state variable, using a state model having a correlation between the state variable and a cognitive load during steering of the steersman.

According to the state estimation method of Configuration 5, it is possible to estimate the state of the steersman, who steers the moving object, using the state model. For this reason, it is possible to more appropriately determine the state of the steersman, and thus to contribute to the development of a sustainable transportation system.

(Configuration 6) A non-transitory computer-readable recording medium storing a program for causing a computer to function as: an acquisition unit configured to acquire a state variable including an observation value obtained by observing a steersman who steers an moving object; and an estimation unit including a state model having a correlation between the state variable and a cognitive load during steering of the steersman and configured to estimate a state of the steersman from the state variable acquired by the acquisition unit.

By executing the program according to Configuration 6, it is possible to estimate the state of the steersman, who steers the moving object, using the state model. For this reason, it is possible to more appropriately determine the state of the steersman, and thus to contribute to the development of a sustainable transportation system.

(Configuration 7) The information processing system according to any one of Configurations 1 to 4, further including an output control unit configured to control output from an output device mounted on the moving object, in which the estimation unit is configured to estimate from the state variable acquired by the acquisition unit whether the state of the steersman is in a high cognitive load state, a moderate cognitive load state, or a low cognitive load state, and the output control unit is configured to control, based on an estimation result of the estimation unit, the output from the output device such that the state of the steersman approaches a moderate cognitive load state.

According to the information processing system of Configuration 7, the steersman is supported such that the cognitive load of the steersman approaches the moderate state who steers the moving object. For this reason, it is possible to provide an appropriate support according to the state of the steersman who steers the moving object, and thus to contribute to the development of a sustainable transportation system.

(Configuration 8) The information processing system according to any one of Configurations 1, 2, 3, 4, and 7, in which the output control unit is configured to: adjust the output from the output device so as to reduce an amount of cognitive processing of the steersman when the estimation unit estimates that the state of the steersman is in the high cognitive load state; adjust the output from the output device so as to increase the amount of cognitive processing of the steersman when the estimation unit estimates that the state of the steersman is in the low cognitive load state; and adjust the output from the output device so as to prevent a change in the amount of cognitive processing of the steersman when the estimation unit estimates that the state of the steersman is in the moderate cognitive load state.

According to the information processing system of Configuration 8, it is possible to provide more appropriate support to the steersman by adjusting the output from the output device depending on whether the state of the steersman is in the high cognitive load state, the low cognitive load state, or the moderate cognitive load state, as an estimation result.

In the information processing system, the observation value may include at least one of the heartbeat interval, the breathing interval, and the pupil diameter of the steersman.

According to this configuration, it is possible to estimate the state of the steersman with higher accuracy using the observation value regarding the body of the steersman.

(Configuration 9) The information processing system according to any one of Configurations 1, 2, 3, 4, 7, and 8, in which the observation value includes a first observation value and a second observation value selected from any of a heartbeat interval, a breathing interval, and a pupil diameter of the steersman, and the estimation unit includes a state model having a correlation among the first observation value, the second observation value, and the cognitive load of the steersman, and estimates a state of the steersman from the first observation value and the second observation value included in the state variable.

According to the information processing system of Configuration 9, it is possible to estimate the state of the steersman with higher accuracy from a plurality of observation values regarding the body of the steersman using the state model.

(Configuration 10) The information processing method according to Configuration 5, further including: using the state model to estimate whether the state of the steersman is in a high cognitive load state, a moderate cognitive load state, or a low cognitive load state; and controlling, based on an estimation result, output from an output device mounted on the moving object such that the state of the steersman approaches the moderate cognitive load state.

According to the control method of Configuration 10, the steersman is supported such that the cognitive load of the steersman approaches the moderate state who steers the moving object. For this reason, it is possible to provide an appropriate support according to the state of the steersman who steers the moving object, and thus to contribute to the development of a sustainable transportation system.

(Configuration 11) The non-transitory computer-readable recording medium storing the program according to Configuration 6, in which the program causes the computer to function as an output control unit, the estimation unit includes the state model having the correlation between the state variable and the cognitive load during steering of the steersman and estimates from the state variable acquired by the acquisition unit whether the state of the steersman is in a high cognitive load state, a moderate cognitive load state, or a low cognitive load state, and the output control unit has a function of controlling output from an output device mounted on the moving object, and controls, based on an estimation result of the estimation unit, the output from the output device such that the state of the steersman approaches the moderate cognitive load state.

By executing the program according to Configuration 11, the steersman is supported such that the cognitive load of the steersman approaches the moderate state who steers the moving object. For this reason, it is possible to provide an appropriate support according to the state of the steersman who steers the moving object, and thus to contribute to the development of a sustainable transportation system.

(Configuration 12) The information processing system according to any one of Configurations 1, 2, 3, 4, 7, 8, and 9, in which the information processing system further includes: an observation information generation unit configured to generate observation information of the steersman based on the state variable including the observation value observed at a predetermined timing; an observation information collection unit configured to acquire a plurality of pieces of the observation information that are generated based on the state variable including the observation value of each of a plurality of the steersmen, respectively; and an clustering processing unit configured to cluster the plurality of pieces of observation information acquired by the observation information collection unit into a plurality of clusters.

According to the information processing system of Configuration 12, it is possible to obtain information for determining the state of the steersman based on information regarding the plurality of steersmen by clustering the observation information generated about the plurality of steersmen who steer the moving object. For this reason, it is possible to realize a technology for determining the state of the steersman, who steers the moving object, with higher accuracy, and thus to contribute to the development of a sustainable transportation system.

(Configuration 13) The information processing system according to Configuration 12, further including an cluster allocation unit configured to assign a meaning corresponding to a cognitive load during steering of the steersman to each of the plurality of clusters.

According to the information processing system of Configuration 13, it is possible to obtain information indicating a correlation between the observation value and the cognitive load by classifying the state variable including the observation value regarding the steersman into clusters associated with the cognitive load during steering. Thus, it is possible to realize a technology for determining the state of the steersman, who steers the moving object, with higher accuracy.

In the information processing system, the cluster allocation unit may be configured to assign a meaning corresponding to the height of the cognitive load during steering of the steersman, to each of the plurality of clusters.

According to this configuration, it is possible to obtain information indicating a correlation between the observation value and the height of the cognitive load, using the observation value regarding the steersman. Thus, it is possible to realize a technology for determining the state of the steersman, who steers the moving object, with higher accuracy.

(Configuration 14) The information processing system according to any one of Configurations 1, 2, 3, 4, 7, 8, 9, 12, and 13, in which the acquisition unit is mounted on the moving object, and the observation information collection unit is configured to acquire the observation information, which is generated by the observation information generation unit based on the state variable acquired by the acquisition unit in the moving object, from a plurality of the moving objects.

According to the information processing system of Configuration 14, it is possible to obtain information indicating a correlation between the observation value and the state of the steersman, based on more information, by collecting the information regarding the observation value of the steersman from the plurality of moving objects. For this reason, it is possible to realize a technology for determining the state of the steersman with higher accuracy.

In the information processing system, the observation value may include at least one of the heartbeat interval, the breathing interval, and the pupil diameter of the steersman.

According to this configuration, it is possible to estimate the state of the steersman with higher accuracy from the observation value regarding the body of the steersman.

In the information processing system, the state variable may include the observation value and the amount of operation of the operation unit provided in the moving object.

According to this configuration, it is possible to estimate the state of the steersman with higher accuracy by reflecting the operation of the steersman with respect to the operation unit of the moving object.

(Configuration 15) The information processing method according to Configuration 5 or 10, further including: generating observation information of the steersman based on the state variable including the observation value observed at a predetermined timing; acquiring a plurality of pieces of the observation information that are generated based on the state variable including the observation value of each of a plurality of the steersmen, respectively; and clustering the plurality of pieces of observation information acquired into a plurality of clusters.

According to the information processing method of Configuration 15, it is possible to obtain information for determining the state of the steersman based on information regarding the plurality of steersmen by clustering the observation information generated about the plurality of steersmen who steer the moving object. For this reason, it is possible to realize a technology for determining the state of the steersman, who steers the moving object, with higher accuracy, and thus to contribute to the development of a sustainable transportation system.

(Configuration 16) The information processing system according to any one of Configurations 1, 2, 3, 4, 7, 8, 9, 12, 13, and 14, further including: an observation information generation unit configured to generate observation information of the steersman based on the state variable including the observation value observed in the moving object; a state model generation unit configured to generate a state model having a correlation between the state variable and a cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters, and the estimation unit configured to estimate the state of the steersman from the state variable or the observation information by using the state model.

According to the information processing system of Configuration 16, the state of the steersman is estimated using the state model generated from the observation value obtained by observing one steersman. For this reason, it is possible to estimate the state of the steersman with higher accuracy, and thus to contribute to the development of a sustainable transportation system.

(Configuration 17) In the information processing method according to any one of Configurations 5, 10, and 15, further including: generating observation information of the steersman based on the state variable including the observation value observed at a predetermined timing; generating the state model having the correlation between the state variable and the cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters; and estimating the state of the steersman from the state variable or the observation information by using the state model.

According to the information processing method of Configuration 17, the state of the steersman is estimated using the state model generated from the observation value obtained by observing one steersman. For this reason, it is possible to estimate the state of the steersman with higher accuracy, and thus to contribute to the development of a sustainable transportation system.

(Configuration 18) The non-transitory computer-readable recording medium storing the program according to Configuration 6 or 11, in which the program causes the computer to function as: an observation information generation unit configured to generate observation information of the steersman based on the state variable including the observation value observed in the moving object; and a state model generation unit configured to generate the state model having the correlation between the state variable and the cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters, and the estimation unit is configured to estimate the state of the steersman from the state variable or the observation information by using the state model.

By executing the program of Configuration 18, the state of the steersman is estimated using the state model generated from the observation value obtained by observing one steersman. For this reason, it is possible to estimate the state of the steersman with higher accuracy, and thus to contribute to the development of a sustainable transportation system.

(Configuration 19) The information processing system according to any one of Configurations 1, 2, 3, 4, 7, 8, 9, 12, 13, 14, and 16, further including a state estimation device mounted on the moving object and a management device communicably connected to the state estimation device, in which the state estimation device includes: the acquisition unit; an observation information generation unit configured to generate observation information of the steersman based on the state variable including the observation value observed at a predetermined timing; and a state model acquisition unit configured to acquire, from the management device, the state model having the correlation between the state variable and the cognitive load during steering of the steersman, the estimation unit is configured to estimate the state of the steersman from the state variable or the observation information by using the state model, and the management device includes: an observation information collection unit configured to acquire, from the state estimation device, a plurality of pieces of the observation information that are generated based on the state variable including the observation value of each of a plurality of the steersmen, respectively; a state model generation unit configured to generate the state model by executing a process of clustering a plurality of pieces of the observation information acquired by the observation information collection unit into a plurality of clusters, and assigning a meaning corresponding to the cognitive load during steering of the steersman to each of the plurality of clusters; and a transmission processing unit configured to transmit the state model, which is generated by the state model generation unit, to the state estimation device.

According to the information processing system of Configuration 19, it is possible to estimate the state of the steersman with higher accuracy, using the state model generated from the observation value obtained by observing the steersman of the moving object. For this reason, it is possible to provide an appropriate support to the steersman, and thus to contribute to the development of a sustainable transportation system.

(Configuration 20) The information processing method according to any one of Configurations 5, 10, 15, and 17, in which the method is executed by a computer functioning as a state estimation device mounted on the moving object and a computer functioning as a management device communicably connected to the state estimation device, the method uses the state estimation device to: acquire a state variable including an observation value obtained by observing a steersman who steers an moving object; generate observation information of the steersman based on the state variable including the observation value observed at a predetermined timing; acquire, from the management device, a state model having the correlation between the state variable and the cognitive load during steering of the steersman; and estimate the state of the steersman from the state variable or the observation information by using the state model, and the method uses the management device to: acquire, from the state estimation device, a plurality of pieces of the observation information that are generated based on the state variable including the observation value of each of a plurality of the steersmen, respectively; generate the state model by executing a process of clustering a plurality of pieces of the observation information acquired into a plurality of clusters, and assigning a meaning corresponding to the cognitive load during steering of the steersman to each of the plurality of clusters; and transmit the generated state model to the state estimation device.

According to the information processing system of Configuration 20, it is possible to estimate the state of the steersman with higher accuracy, using the state model generated from the observation value obtained by observing the steersman of the moving object. For this reason, it is possible to provide an appropriate support to the steersman, and thus to contribute to the development of a sustainable transportation system.

REFERENCE SIGNS LIST 1, 2 vehicle (moving object)
5, 7 server (management device)
10, 60 information processing device (state estimation device)
20 state estimation device (control device)
100, 600 processor
101, 601 acquisition unit
102, 602 observation information generation unit
103, 603 observation information transmission unit
104, 604 state model acquisition unit
110, 610 estimation unit
111, 611 state model
112, 612 output control unit
120, 620 memory
121, 621 control program
122, 622 application
123, 623 observation information
131, 231, 631 sensor I/F
132, 232, 632 operation unit I/F
200 processor
201 acquisition unit
202 observation information generation unit
204 state model acquisition unit
210 estimation unit
211 state model
212 output control unit
221 control program
222 application
301 communication device
302 display (output device, display unit)
303 speaker (output device)
304 meter panel (output device, display unit)
311 camera
312 heartbeat sensor
321 accelerator pedal sensor
322 brake pedal sensor
323 steering angle sensor
330 vehicle function unit
331 navigation system
350 dashboard
351 steering wheel
354 electrode
361, 391 state display unit
500, 700 processor
501, 701 observation information collection unit
502, 702 transmission processing unit
510, 710 state model generation unit
511, 711 clustering processing unit
512, 712 cluster allocation unit
513, 713 state model
520, 720 memory
521, 721 control program
522, 722 application
523, 723 observation information
524, 724 state model
530, 730 communication device
1000, 2000 information processing system
NW communication network
R, P observation value
U1, U1A, U1B, U2, U2A, U2B user (steersman)

What is claimed is:

1. An information processing system comprising:
    an acquisition unit configured to acquire a state variable including an observation value obtained by observing a steersman who steers an moving object;
    an estimation unit including a state model having a correlation between the state variable and a cognitive load during steering of the steersman and configured to estimate a state of the steersman from the state variable acquired by the acquisition unit; and
    an output control unit configured to control output from an output device mounted on the moving object, wherein
    the estimation unit is configured to estimate from the state variable acquired by the acquisition unit whether the state of the steersman is in a high cognitive load state, a moderate cognitive load state, or a low cognitive load state,
    the output control unit is configured to control, based on an estimation result of the estimation unit, the output from the output device such that the state of the steersman approaches the moderate cognitive load state, and
    the output control unit configured to
        adjust the output from the output device so as to reduce an amount of cognitive processing of the steersman when the estimation unit estimates that the state of the steersman is in the high cognitive load state,
        adjust the output from the output device so as to increase the amount of cognitive processing of the steersman when the estimation unit estimates that the state of the steersman is in the low cognitive load state, and
        adjust the output from the output device so as to prevent a change in the amount of cognitive processing of the steersman when the estimation unit estimates that the state of the steersman is in the moderate cognitive load state.

2. The information processing system according to claim 1, wherein
    the observation value includes a first observation value and a second observation value selected from any of a heartbeat interval, a breathing interval, and a pupil diameter of the steersman, and
    the estimation unit includes a state model having a correlation among the first observation value, the second observation value, and the cognitive load of the steersman, and estimates a state of the steersman from the first observation value and the second observation value included in the state variable.

3. The information processing system according to claim 1, wherein
the acquisition unit is configured to acquire the state variable at a predetermined period, and
the estimation unit is configured to estimate the state of the steersman from the state variable acquired whenever the acquisition unit acquires the state variable.

4. The information processing system according to claim 1, wherein
the state model is generated by execution of a process of clustering observation information generated based on the state variable including the observation value obtained by observing the steersman at a predetermined observation timing into a plurality of clusters and a process of assigning a meaning corresponding to the cognitive load during steering of the steersman to each of the plurality of clusters.

5. The information processing system according to claim 1, wherein
the observation value includes a first observation value and a second observation value selected from any of a heartbeat interval, a breathing interval, and a pupil diameter of the steersman, and
the estimation unit includes a state model having a correlation among the first observation value, the second observation value, and the cognitive load of the steersman, and estimates a state of the steersman from the first observation value and the second observation value included in the state variable.

6. The information processing system according to claim 1, further comprising:
an observation information generation unit configured to generate observation information of the steersman based on the state variable including the observation value observed at a predetermined timing;
an observation information collection unit configured to acquire a plurality of pieces of the observation information that are generated based on the state variable including the observation value of each of a plurality of the steersmen, respectively; and
an clustering processing unit configured to cluster the plurality of pieces of observation information acquired by the observation information collection unit into a plurality of clusters.

7. The information processing system according to claim 6, further comprising
an cluster allocation unit configured to assign a meaning corresponding to a cognitive load during steering of the steersman to each of the plurality of clusters.

8. The information processing system according to claim 6, wherein
the acquisition unit is mounted on the moving object, and
the observation information collection unit is configured to acquire the observation information, which is generated by the observation information generation unit based on the state variable acquired by the acquisition unit in the moving object, from a plurality of the moving objects.

9. The information processing system according to claim 1, further comprising:
an observation information generation unit configured to generate observation information of the steersman based on the state variable including the observation value observed in the moving object; and
a state model generation unit configured to generate a state model having a correlation between the state variable and a cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters, wherein
the estimation unit is configured to estimate the state of the steersman from the state variable or the observation information by using the state model.

10. The information processing system according to claim 1, further comprising
a state estimation device mounted on the moving object and a management device communicably connected to the state estimation device, wherein
the state estimation device includes:
the acquisition unit;
an observation information generation unit configured to generate observation information of the steersman based on the state variable including the observation value observed at a predetermined timing; and
a state model acquisition unit configured to acquire, from the management device, the state model having the correlation between the state variable and the cognitive load during steering of the steersman,
the estimation unit is configured to estimate the state of the steersman from the state variable or the observation information by using the state model, and
the management device includes:
an observation information collection unit configured to acquire, from the state estimation device, a plurality of pieces of the observation information that are generated based on the state variable including the observation value of each of a plurality of the steersmen, respectively;
a state model generation unit configured to generate the state model by executing a process of clustering a plurality of pieces of the observation information acquired by the observation information collection unit into a plurality of clusters, and assigning a meaning corresponding to the cognitive load during steering of the steersman to each of the plurality of clusters; and
a transmission processing unit configured to transmit the state model, which is generated by the state model generation unit, to the state estimation device.

11. An information processing method performed by a computer, comprising steps of:
acquiring a state variable including an observation value obtained by observing a steersman who steers an moving object;
estimating a state of the steersman from the acquired state variable, using a state model having a correlation between the state variable and a cognitive load during steering of the steersman; and
controlling output from an output device mounted on the moving object wherein
the step of estimating is to estimate from the state variable acquired by the step of acquiring whether the state of the steersman is in a high cognitive load state, a moderate cognitive load state, or a low cognitive load state,
the step of controlling is to control, based on an estimation result of the step of estimating, the output from the output device such that the state of the steersman approaches the moderate cognitive load state, and the step of controlling is to
adjust the output from the output device so as to reduce an amount of cognitive processing of the steersman when the step of estimating estimates that the state of the steersman is in the high cognitive load state,
adjust the output from the output device so as to increase the amount of cognitive processing of the steersman when the step of estimating estimates that the state of the steersman is in the low cognitive load state, and
adjust the output from the output device so as to prevent a change in the amount of cognitive processing of the steersman when the step of estimating estimates that the state of the steersman is in the moderate cognitive load state.

12. The information processing method according to claim 11, further comprising:
using the state model to estimate whether the state of the steersman is in a high cognitive load state, a moderate cognitive load state, or a low cognitive load state; and
controlling, based on an estimation result, output from the output device mounted on the moving object such that the state of the steersman approaches the moderate cognitive load state.

13. The information processing method according to claim 11, further comprising:
generating observation information of the steersman based on the state variable including the observation value observed at a predetermined timing;
acquiring a plurality of pieces of the observation information that are generated based on the state variable including the observation value of each of a plurality of the steersmen, respectively; and
clustering the plurality of pieces of observation information acquired into a plurality of clusters.

14. The information processing method according to claim 11, further comprising:
generating observation information of the steersman based on the state variable including the observation value observed at a predetermined timing;
generating the state model having a correlation between the state variable and the cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters; and
estimating the state of the steersman from the state variable or the observation information by using the state model.

15. The information processing method according to claim 11, wherein
the method is executed by a computer functioning as a state estimation device mounted on the moving object and a computer functioning as a management device communicably connected to the state estimation device,
the method uses the state estimation device to:
acquire a state variable including an observation value obtained by observing a steersman who steers an moving object;
generate observation information of the steersman based on the state variable including the observation value observed at a predetermined timing;
acquire, from the management device, the state model having the correlation between the state variable and the cognitive load during steering of the steersman; and
estimate the state of the steersman from the state variable or the observation information by using the state model, and
the method uses the management device to:
acquire, from the state estimation device, a plurality of pieces of the observation information that are generated based on the state variable including the observation value of each of a plurality of the steersmen, respectively;
generate the state model by executing a process of clustering a plurality of pieces of the observation information acquired into a plurality of clusters, and assigning a meaning corresponding to the cognitive load during steering of the steersman to each of the plurality of clusters; and
transmit the generated state model to the state estimation device.

16. A non-transitory computer-readable recording medium storing a program for causing a computer to function as:
an acquisition unit configured to acquire a state variable including an observation value obtained by observing a steersman who steers an moving object;
an estimation unit including a state model having a correlation between the state variable and a cognitive load during steering of the steersman and configured to estimate a state of the steersman from the state variable acquired by the acquisition unit; and
an output control unit configured to control output from an output device mounted on the moving object, wherein
the estimation unit is configured to estimate from the state variable acquired by the acquisition unit whether the state of the steersman is in a high cognitive load state, a moderate cognitive load state, or a low cognitive load state,
the output control unit is configured to control, based on an estimation result of the estimation unit, the output from the output device such that the state of the steersman approaches the moderate cognitive load state, and
the output control unit configured to
adjust the output from the output device so as to reduce an amount of cognitive processing of the steersman when the estimation unit estimates that the state of the steersman is in the high cognitive load state,
adjust the output from the output device so as to increase the amount of cognitive processing of the steersman when the estimation unit estimates that the state of the steersman is in the low cognitive load state, and
adjust the output from the output device so as to prevent a change in the amount of cognitive processing of the steersman when the estimation unit estimates that the state of the steersman is in the moderate cognitive load state.

17. The non-transitory computer-readable recording medium storing the program according to claim 16, wherein
the estimation unit includes the state model having the correlation between the state variable and the cognitive load during steering of the steersman and estimates from the state variable acquired by the acquisition unit whether the state of the steersman is in a high cognitive load state, a moderate cognitive load state, or a low cognitive load state, and the output control unit controls, based on an estimation result of the estimation unit, the output from the output device such that the state of the steersman approaches the moderate cognitive load state.

18. The non-transitory computer-readable recording medium recorded storing the program according to claim 16, wherein the program causes the computer to function as:

an observation information generation unit configured to generate observation information of the steersman based on the state variable including the observation value observed in the moving object; and a state model generation unit configured to generate a state model having a correlation between the state variable and the cognitive load during steering of the steersman by executing a process of accumulating the observation information of the one steersman, clustering a plurality of pieces of the accumulated observation information into a plurality of clusters, and assigning a meaning corresponding to the cognitive load during steering of the steersman to each of the plurality of clusters, and the estimation unit is configured to estimate the state of the steersman from the state variable or the observation information by using the state model.

\* \* \* \* \*